United States Patent [19]

Jean et al.

[11] 4,312,045
[45] Jan. 19, 1982

[54] RECORDING CONTROL ARRANGEMENT FOR A DOT RECORDING MACHINE

[75] Inventors: Eltgen Jean, Danjoutin; Jossic Alain, Belfort, both of France

[73] Assignee: Compagnie Internationale Pour l'Informatique CII-Honeywell Bull, Paris, France

[21] Appl. No.: 89,039

[22] Filed: Oct. 29, 1979

[30] Foreign Application Priority Data

Dec. 6, 1978 [FR] France .................. 78 34415

[51] Int. Cl.³ .............................................. G06K 3/00
[52] U.S. Cl. .................................. 364/900; 400/124; 364/518; 340/727
[58] Field of Search ... 364/200 MS File, 900 MS File, 364/518, 521; 400/124; 340/727

[56] References Cited

U.S. PATENT DOCUMENTS

| | | | |
|---|---|---|---|
| 3,814,227 | 6/1974 | Hurd et al. | 191/1 R |
| 3,991,868 | 11/1976 | Robinson et al. | 400/124 |
| 4,029,190 | 6/1977 | Rageni et al. | 364/900 |
| 4,039,066 | 8/1977 | Quigley | 400/124 |
| 4,075,636 | 2/1978 | Galetto et al. | 400/124 |
| 4,096,578 | 6/1978 | Malkemes | 400/124 |
| 4,137,425 | 1/1979 | Ferroglic et al. | 400/124 |
| 4,168,488 | 9/1979 | Evans | 364/521 |
| 4,169,684 | 10/1979 | Blom | 400/124 |

*Primary Examiner*—Joseph M. Thesz
*Assistant Examiner*—C. T. Bartz
*Attorney, Agent, or Firm*—Kerkam, Stowell, Kondracki & Clarke

[57] ABSTRACT

A recording control arrangement for a dot recording machine, having a recording medium and a recording member for recording dots on the medium which is movable relative to the recording member. The control arrangement includes at least one storage member having a plurality of storage locations each adapted to contain a data bit required to cause a dot to be recorded on the medium. A data bit generator for generating data bits which are connected to the storage member to allow them, when actuating, to transmit to the member a bit combination belonging either to a first set of bit combinations, each of which causes an image forming part of a first series of given images to be formed on the medium, or to a second set of bit combinations each of which causes an image forming part of a second series of given images to be formed on the medium, each of the images in the said second series being identical to a respective one of the images in the first series, but being rotated through 90° from the latter, and selecting and control means associated with the said bit generating means. The selecting and control means may be set either to a first state to cause at least one bit combination belonging to the said first set to be transmitted by the generating means, or to a second state to cause at least one bit combination belonging to the second set to be transmitted by the data bit generator. The control arrangement enables the machine to print two different series of characters, the characters forming the second series being identical to those in the first series, but being oriented at 90° to the latter characters so as to make it possible to print, on a recipient paper strip, lines of characters which extend either parallel to the length of the strip or parallel to its width.

6 Claims, 14 Drawing Figures

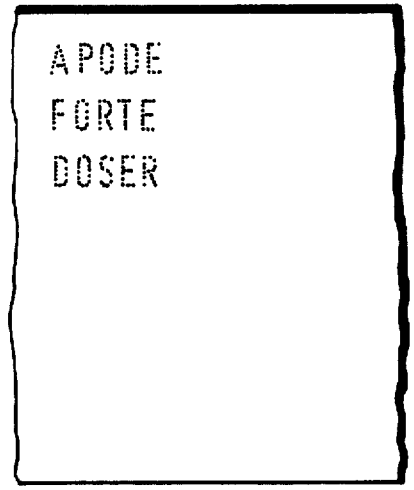
FIG. 7
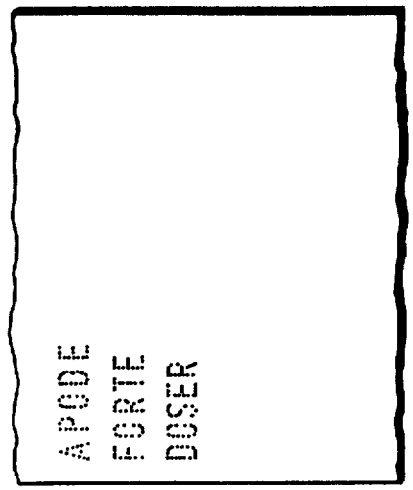
FIG. 6
FIG. 2

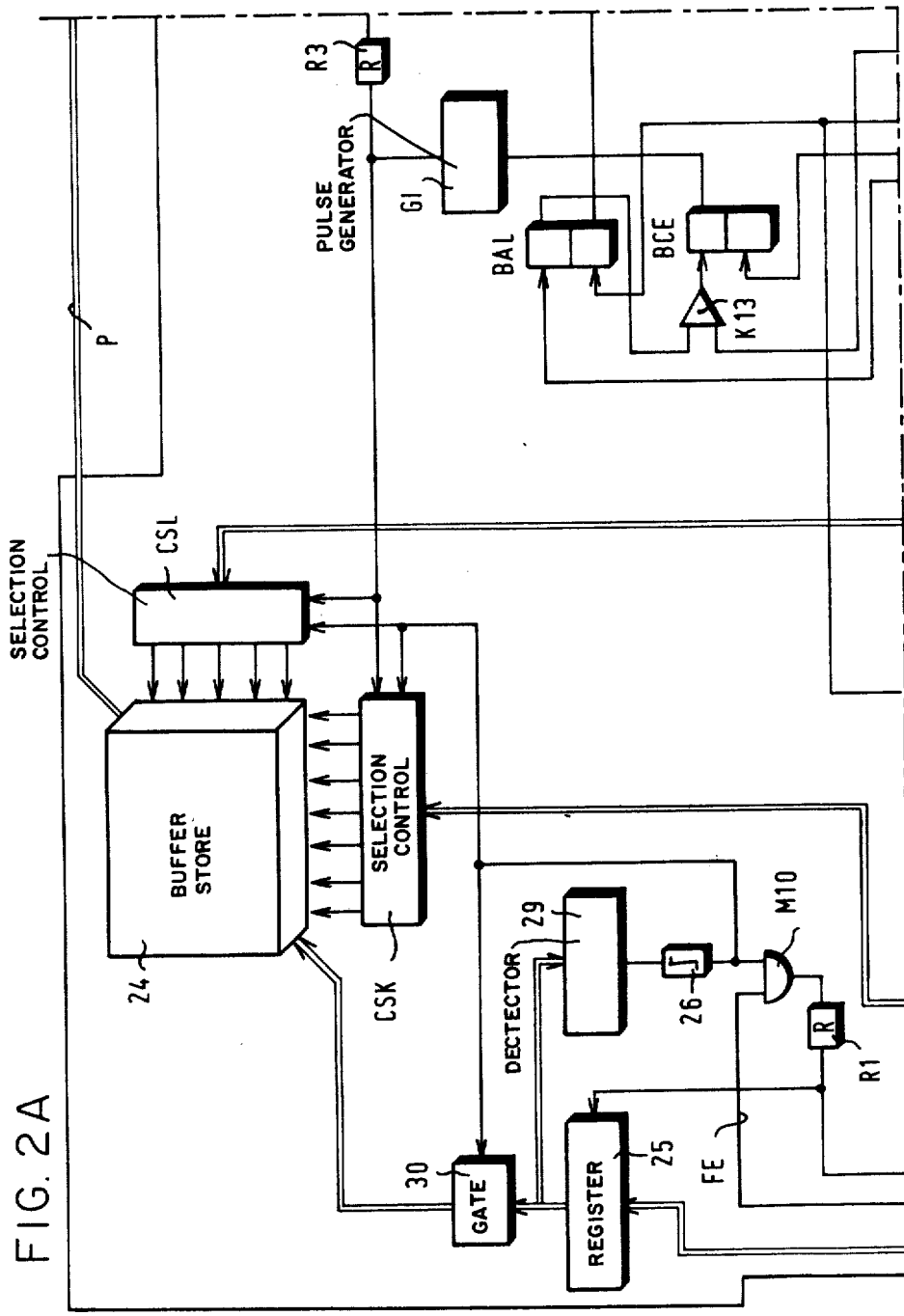

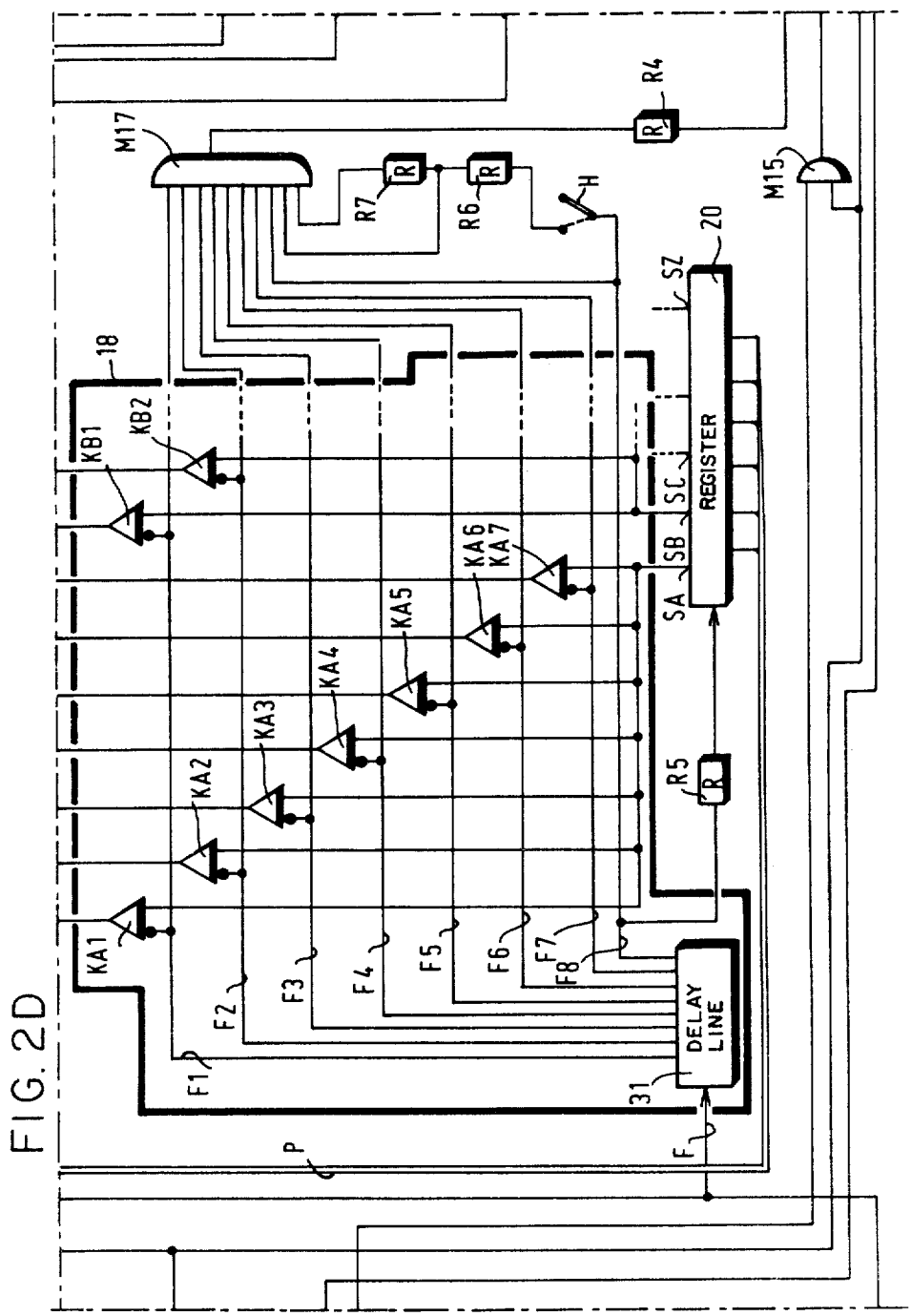

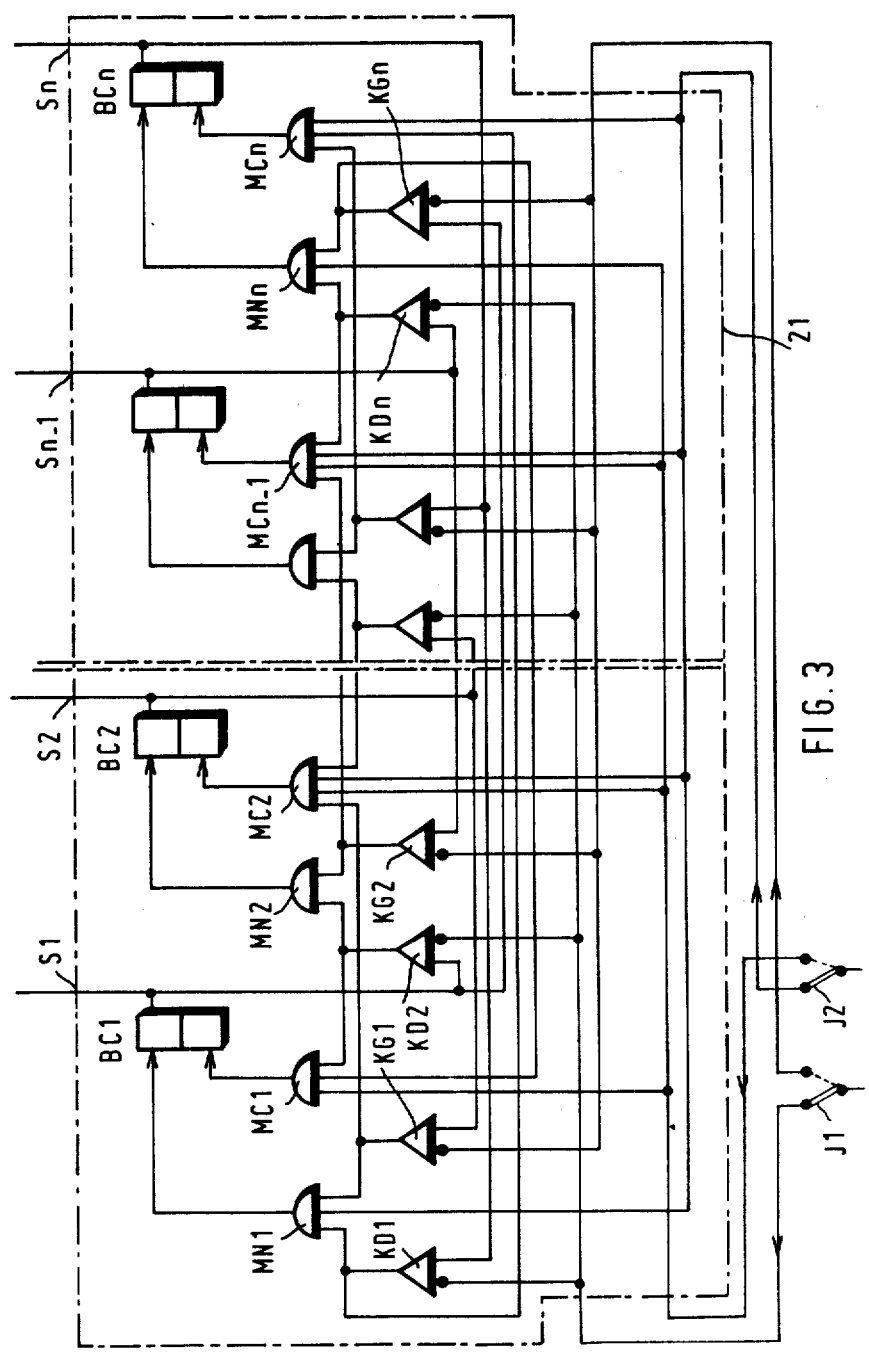

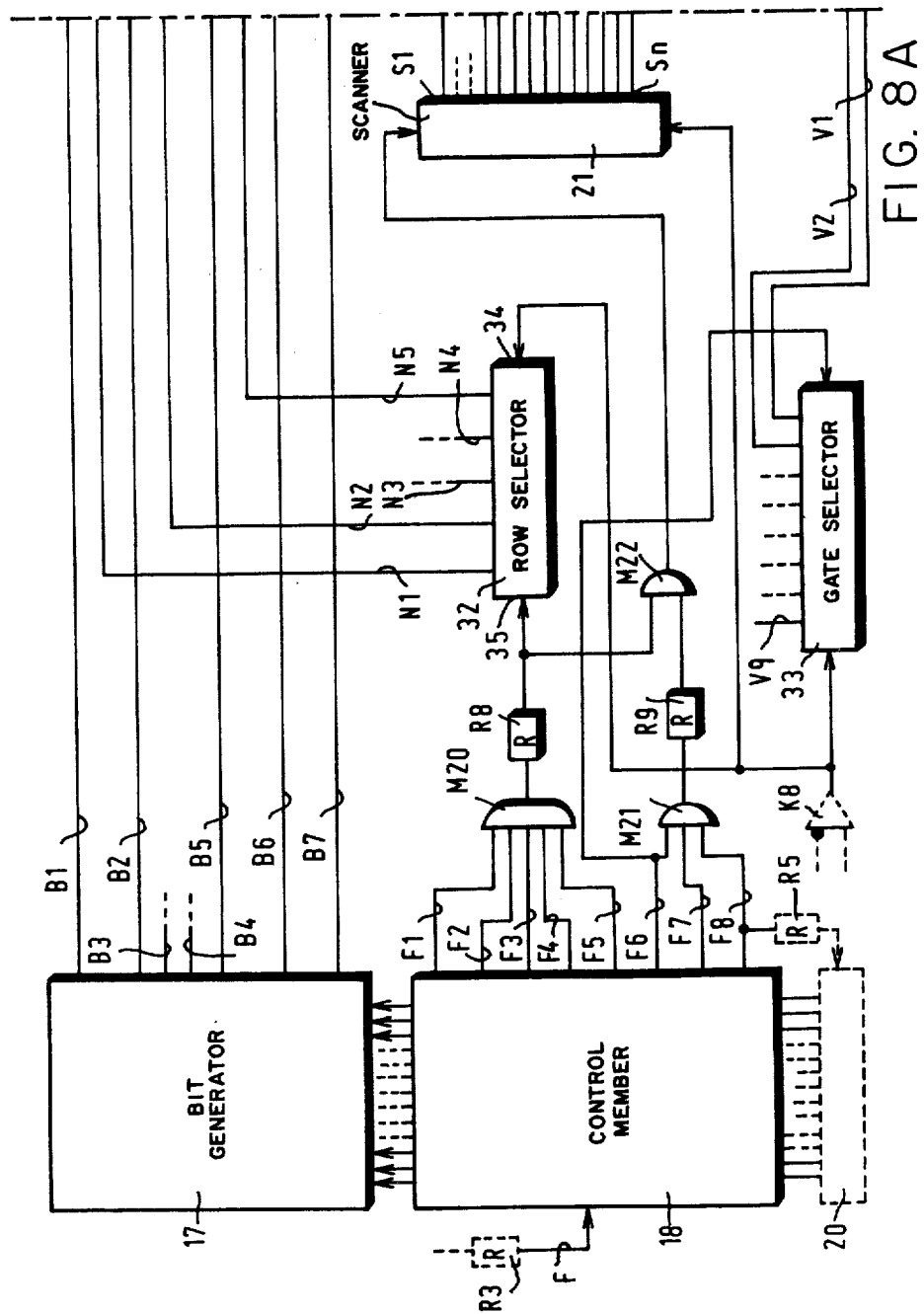

RECORDING CONTROL ARRANGEMENT FOR A DOT RECORDING MACHINE

BACKGROUND OF THE INVENTION

1. Field of the invention

The present invention relates to a recording control arrangement for a dot recording machine. Such an arrangement may find application particularly, although not exclusively, in printing machines of the so-called dot-printing kind, in which a character is printed by printing a set of dots lying within a matrix.

2. Description of the Prior art

Dot recording machines generally have a recording medium which may take either the form of a strip or sheet of paper or the form of a rotary drum or endless belt on the surface of which a series of sensitized point zones can be formed by electrostatic or magnetic means. These zones are capable of attracting a powdered developing pigment which is then transferred to a carrier sheet. To enable a series of dots, forming predetermined images such as characters, to be recorded on this medium, at least one recording member is provided having one or more recording units. Depending upon the type of machine, these units are formed by printing styli, punches, electrodes, ink-jet nozzles or magnetic recording heads. The recording member and the recording medium are moved in relation to one another in a known fashion in a predetermined direction of movement. Printing machines of this kind are known. For example, one such machine is described in U.S. Pat. No. 4,100,551. The printing machine described in the afore-noted patent is capable of so-called line by line printing, i.e. printing where characters on a line are only printed when the printing of the characters lying on the previous line has been completed.

In column by column printing, in order to print a text containing a certain number of lines, each of the printing heads prints, in the course of one and the same pass, the same number of characters as there are lines to be printed. Thus, in the course of the first pass, a head prints the first characters of the words lying on the different lines. In the course of the second pass, the head prints the second characters of the words situated on the various lines, and so on.

When an operator causes a text to be printed by a machine using either the line by line method of printing or the column by column method, the text presented on the recipient paper strip at the conclusion of printing is always orientated in the same direction, i.e. the lines in the printed text are always parallel to the lengthwise direction of the strip. Because there are limits on how wide the strip can be, it is therefore impossible, with this machine, to print texts or statements containing a very large number of lines.

SUMMARY OF THE INVENTION

The present invention overcomes this disadvantage and provides a recording control arrangement which, when fitted to a dot recording machine, enables the machine to record on a medium images, such as characters, for example, in two different orientations. In particular, when applied to a dot printing machine, such a control arrangement enables the machine to print two different series of characters, the characters forming the second series being identical to those in the first series, but being orientated at 90° to the latter characters. This being the case, it becomes possible to print, on a recipient paper strip, lines of characters which extend either parallel to the length of the strip or parallel to its width.

An object of the invention relates to a recording control arrangement for a dot recording machine, this machine having a recording medium and at least one member for recording dots on the medium, the said member and the said medium being moved relative to one another in a predetermined direction of movement, the arrangement being characterized in that it comprises at least one storage member having storage locations each adapted to contain a data bit required to cause a dot to be recorded on the medium, means for generating data bits which are connected to the storage member to allow them, when actuated, to transmit to the member a bit combination belonging either to a first set of bit combinations, each of which causes an image forming part of a first series of giver images to be formed on the medium, or to a second set of bit combinations, each of which causes an image forming part of a second series of given images to be formed on the medium, each of the images in the said second series being identical to a respective one of the images in the first series, but being rotated through 90° from the latter, and selecting and control means associated with the said bit generating means, which selecting and control means may be set either to a first state to cause at least one bit combination belonging to the said first set to be transmitted by the generating means, or to a second state to cause at least one bit combination belonging to the second set to transmitted by the generating means.

BRIEF DESCRIPTION OF THE DRAWINGS

Other objects and advantages of the invention will become apparent from the following description, which is given by way of example, and by reference to the accompanying drawings, in which:

FIG. 3 shows the structure of a scanning circuit employed in the control arrangement of FIG. 1, FIG. 6 shows part of a strip of paper on which characters have been printed by the arrangement of FIG. 1 when operating in a first mode, FIG. 7 shows part of a strip of paper on which characters have been printed by the arrangement of FIG. 1 when operating in a second mode, and FIGS. 8A and 8B, when fitted together on the chain line, show a modified embodiment of recording control arrangement formed in accordance with the invention.

DESCRIPTION OF THE PREFERRED EMBODIMENTS

Figure 1:
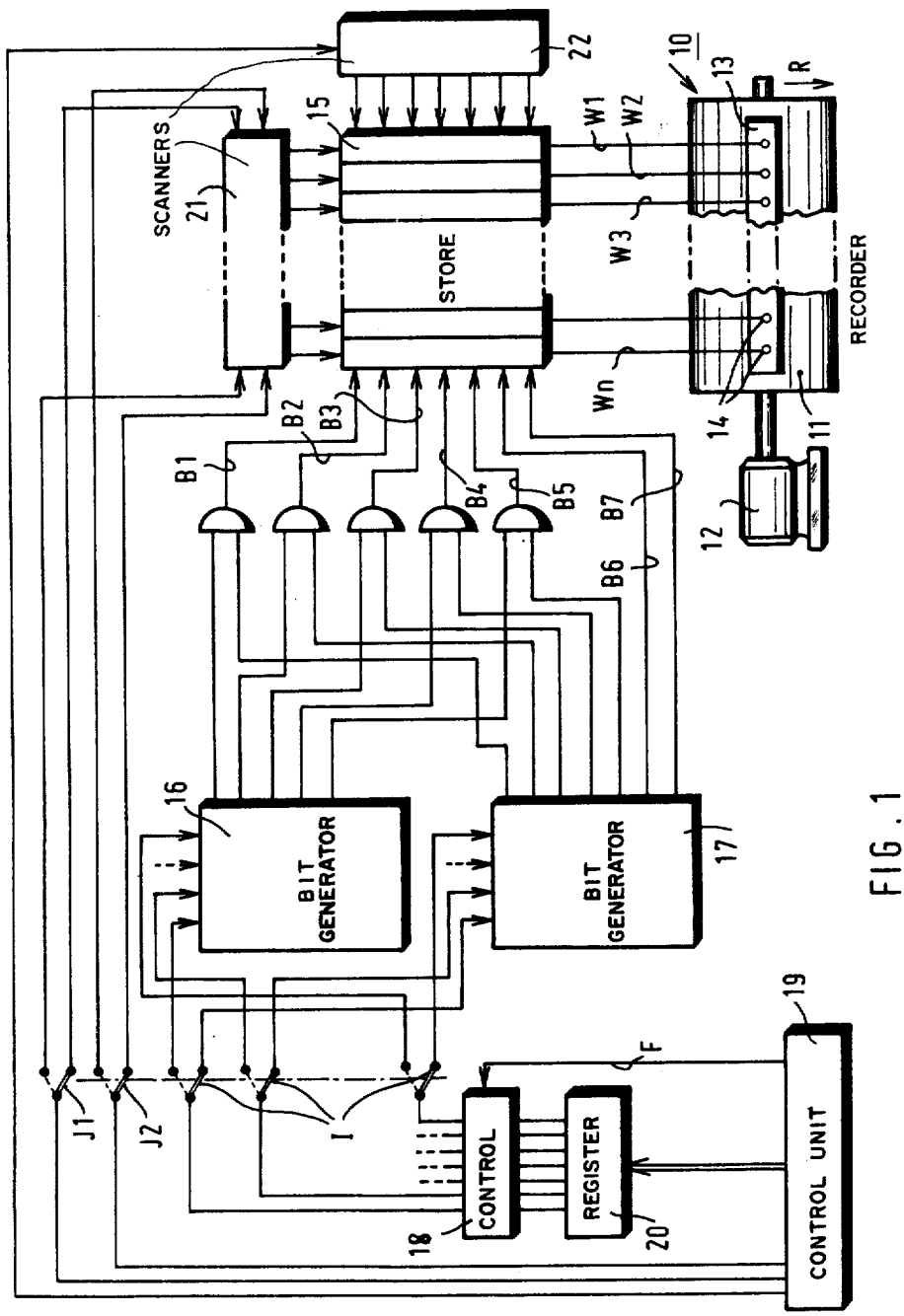
FIG. 1 is a schematic view showing the principal features of a recording control arrangement in accordance with the invention when applied to a non-impact printing machine, FIGS. 2A to 2E, when fitted together, form a detailed logic diagram of the circuits of the control arrangement shown in FIG. 1.

The recording control arrangement which is schematically illustrated in FIG. 1 is intended to control a printing machine of the so-called dot-printing kind. In the present case, the printing machine 10 is a magnetic printer which prints characters on a recipient sheet of paper (not shown) without relying for this on raised type impacting on the said sheet. In the example being described, it will be assumed that the magnetic printer is of the kind which is described in U.S. Pat. No. 3,945,343 as in French patent application 18. 13805, filed in France on May 10, 1978 and published under the French Pat. No. 2,425,281. It should however be appreciated that the magnetic printing machine does not limit the invention and could be replaced by a dot printer of any other kind, such as for example, an impact dot-printer of the kind described and illustrated in Belgian Pat. No. 798,201.

Without going into detail, it will be mentioned that the printing machine 10 shown in FIG. 1 has a recording medium formed by a magnetic drum 11, which is driven in rotation in the direction indicated by an arrow R by an electric motor 12. Data, in the form of magnetized dots forming latent images of the characters to be printed, is recorded on this drum by a magnetic recording member 13 situated close to the surface of the drum. Member 13 concludes n magnetic recording heads 14 positioned one beside the other in a line parallel to the axis of rotation of the drum. Via respective ones of n conductors marked W1, W2 . . . Wn, the heads are connected to the outputs of a storage member 15 whose structure will be described below, but at this point it will merely be mentioned that the member 15 comprises a plurality of storage elements or locations arranged in n columns each associated with one of the n recording heads 14. Each storage location is adapted to contain temporarily a data bit required to cause a magnetized dot to be recorded on the drum 11.

The data bits contained in the storage member 15 arrive, via conductors such as B1, B2, B3 etc. from one or other of two data bit generators 16 and 17. The data bits are emitted in response to actuating signals which are applied to the generators via changeover contacts I and which are emitted by an energization controlling member 18. Member 18 will be described in detail below, but at this point it will suffice to state that the actuating signals are transmitted by the energization controlling member 18 in response to the reception of a control pulse which is transmitted, via a conductor F, by a control unit 19. The actuating signals transmitted are as dictated by the decoding performed by a decoding register 20. Register 20 receives from the control unit 19 the binary coded combination representing a character to be printed.

In addition to transmitting pulses to the energization controlling member 18 and binary coded combinations to the decoding register 20, the control unit 19 also transmits, via changeover contacts J1 and J2, pulses to a scanning circuit 21 associated with storage member 15, to allow the data bits transmitted by generators 16 and 17 to be recorded at predetermined locations in the member 15. A second scanning circuit 22, which is associated with storage member 15 and which is placed under the control of control unit 19, is responsible for extracting the bits contained in member 15 in a predetermined order in order to cause the recording heads 14 to be selectively energized.

Before the components of the arrangement shown in FIG. 1 are described in detail, it should be noted that in the embodiment being described the arrangement is adapted to control the recording of characters on drum 11 wherein each character is formed by a set of dots lying within a matrix containing m rows and p columns, the maximum value of p being equal to m. It should also be noted that the storage locations in storage member 15 are laid out not only in n columns, each associated with one of the n heads 14, but also in m rows, the maximum value of m being equal to n.

In a particularly advantageous embodiment, the values of n, m and p are made equal to 1,040, 7 and 5 respectively. This being the case, each character is formed by a set of dots lying within a matrix made up of 7 rows and 5 columns. It will also be assumed that each character is separated from the neighboring character by a space equivalent to a certain number j of columns. In the embodiment described above, j is selected to be equal to 3. Given that, under these conditions, each character extends across five columns and the space adjacent to its extends across three columns, the maximum number of characters which can be recorded in one line across the drum 11 by means of the n+1040 heads of the member 13 is equal to 1040/8 i.e. 130 characters.

Figure 2B:
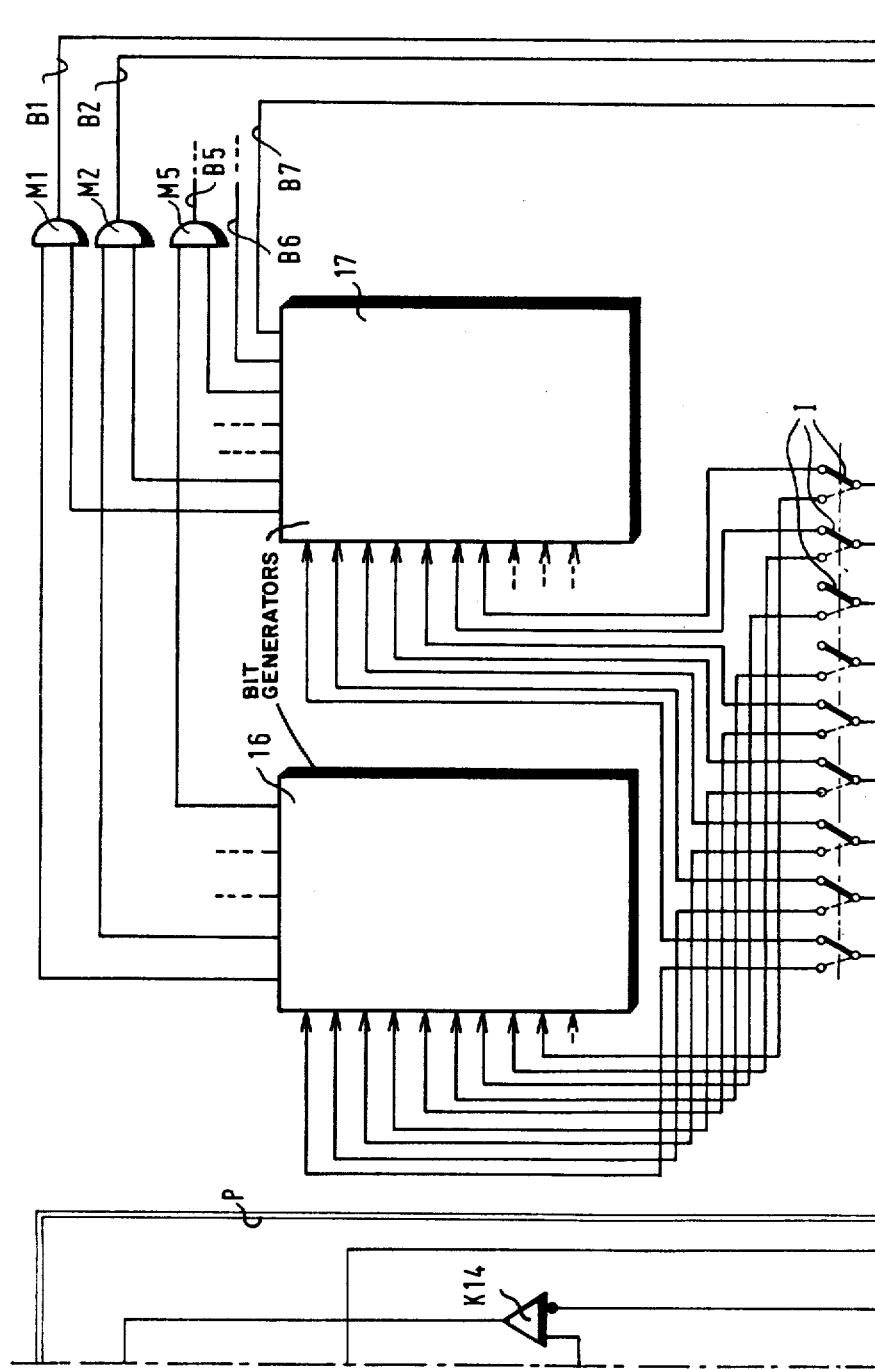
FIG. 2 is a picture map which shows the way in which FIGS. 2A to 2E fit together.
Figure 2C:
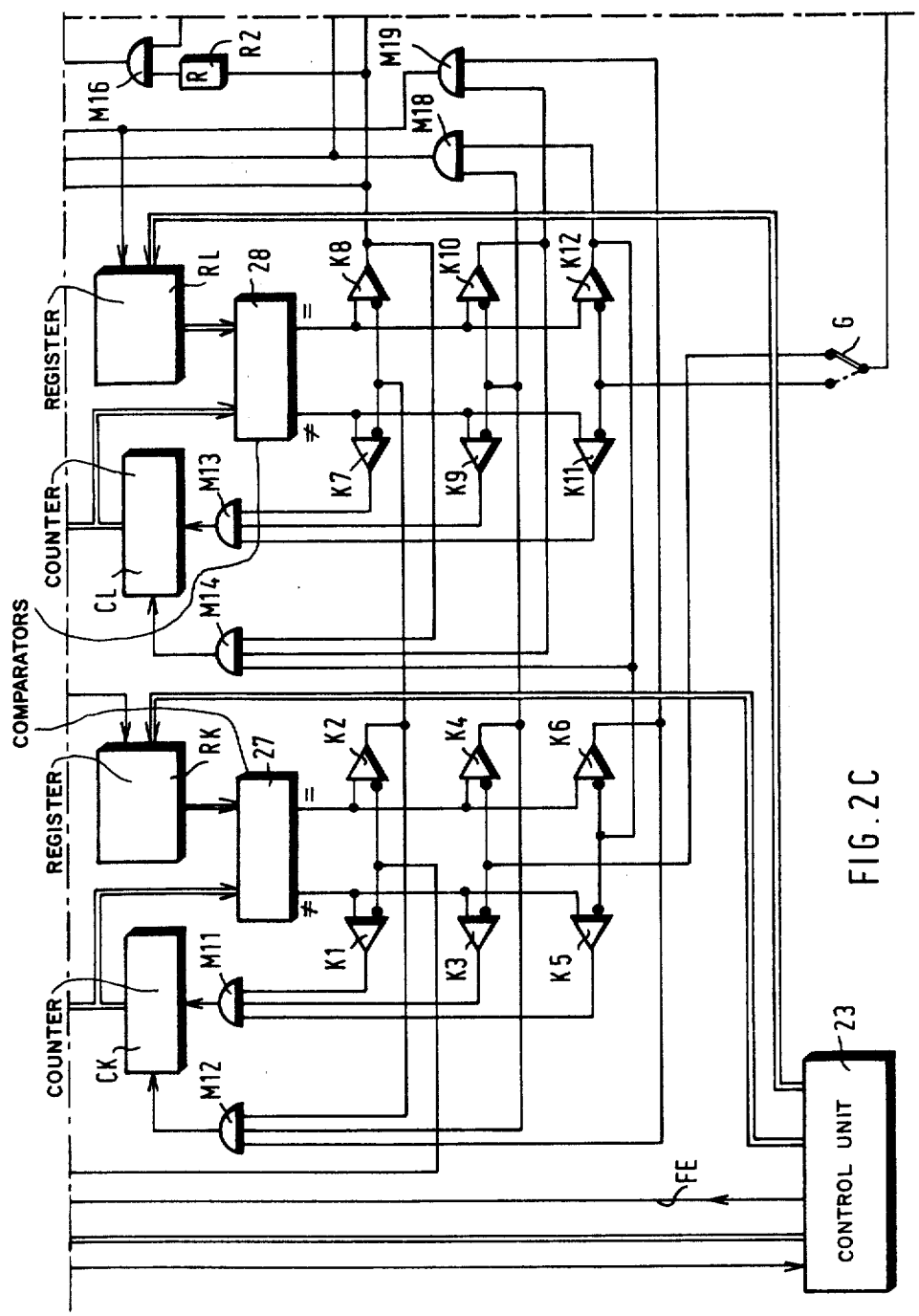
Figure 2E:
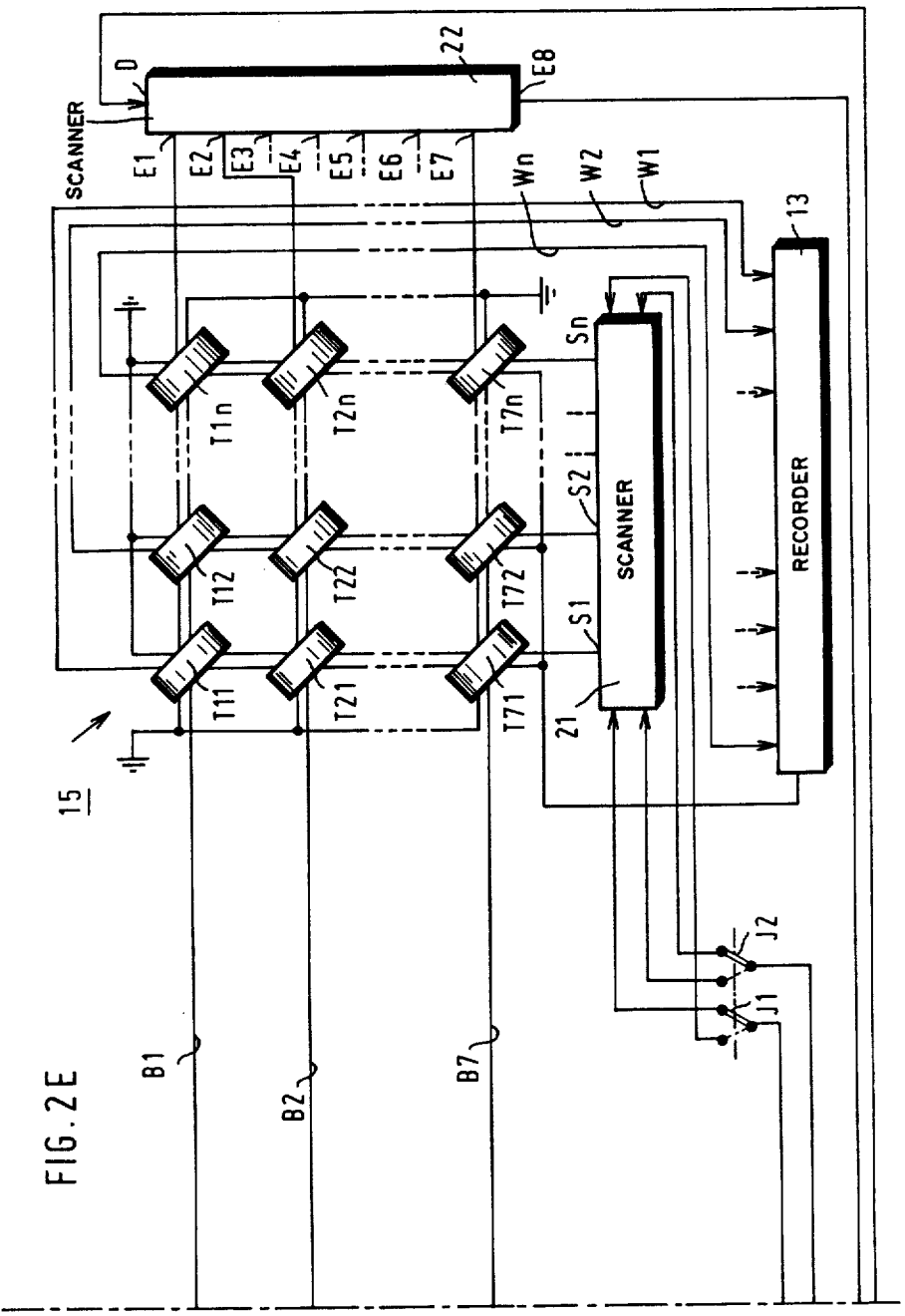

If reference is now made to FIG. 2E, it can be seen that in the embodiment being described, the storage member 15 is formed by a magnetic core-store memory containing mn (i.e. 7280) magnetic cores, these cores being laid out in m (i.e. 7) rows, each containing n (i.e. 1040) magnetic cores. The first row contains cores T11, T12, . . . T1n. The second row contains cores T21, T22, . . . T2n, and so on. Passing through the 7 rows of cores are respective ones of 7 conductors B1, B2, . . . B7. All the cores are, in addition, laid out in n columns. The first column comprises cores T11, T21 . . . T71. The second column comprises cores T12, T22, . . . T72, and so on.,
It may also be noted that, in the schematic views in FIGS. 4 and 5, each magnetic core is indicated symbolically by a square, the seven rows of magnetic cores being marked T1, T2, T3, T4, T5, T6 and T7, and the n columns C1, C2, C3 . . . Cn in these Figures.

Returning to FIG. 2E, it can be seen that running through each column of cores is on the one hand a respective one of n conductors which are each connected to respective ones of the n outputs S1, S2, . . . Sn of the read-in-circuit 21, and on the other hand respective ones of the n conductors W1, W2, . . . Wn mentioned above. The selection of a column of cores, with the object of recording in the said column data bits coming from generators 16 and 17, is the responsibility of the read-in or scanner circuit 21 which, as will be seen below, is adapted to raise only one of its outputs to a positive voltage. When a group of data bits coming from either one of generators 16 and 17 is transmitted to the storage member 15 in the form of electrical pulses via seven conductors B1 to B7, the group of data bits is recorded in the column of cores which has been selected by the read-in circuit 21. The structure of the read-in circuit 21 which is used as a scanning circuit is shown in FIG. 3 in the form of a logic diagram. In this diagram, and also in the logic diagrams in FIGS. 2A to 2E and FIGS. 8A and 8B, the semicircles represent logic "mixing" circuits and the triangles represent control circuits. These circuits are of a known kind and are similar to those described and illustrated, inter alia, in U.S. Pat. Nos. 3,293,617 and 3,276,767. It need only be mentioned here that each control unit has two inputs of which one, marked with a dot in the Figures, is a gated input to which the pulses to be transmitted are applied, and of which the other is a gating input to which an electrical voltage is applied. The control circuit transmits a pulse applied to its gated input only if its gating input is at a positive potential.

Also shown in FIGS. 2A and 3 are bistable components normally referred to as flip-flops. A flip-flop, such as for example flip-flop BAL which is shown in FIG. 2A, has a "normal" input, a "complementary" input, a "normal" output and a "complementary" output, and changes to or remains in the "1" state whenever it receives a pulse at its "normal" input and changes to or remains in the "0" state whenever it receives a pulse at its "complementary" input.

Referring again to FIG. 3, it can be seen that the read-in circuit 21 is formed by a succession of flip-flops BC1, BC2, BCn, whose "normal" outputs are connected to the above mentioned outputs S1, S2 . . . Sn respectively. Progression takes place through the circuit step-by-step in either direction under the control of pulses which are applied to the circuit via changeover contact J1. At any given moment only one of the flip-flops is in the "1" state, the others being the "0" state. Thus, in the case where flip-flop BC1 is in the "1" state, then under these conditions, of all the control circuits KS1, KD2, . . . KDN and KG., KG2, . . . KBn shown in FIG. 3, only the circuits KS2 and KGn which have their gating imputs connected to the "normal" output of flip-flop BC1 will be conductive. If, with changeover contact J1 set to the position shown in solid lines in FIG. 3, a pulse is applied to circuit 21 via contact J1, it travels to the gated inputs of control circuits KD1, KD2, . . . KDn. Due to the fact that, of these circuits, only control circuit KD2 is conductive, the pulse is blocked by all the circuits except circuit KD2, which applies it on the one hand, via a mixing circuit MC1, to the complementary input of flip-flop BC1, and on the other hand, via a mixing circuit MN2, to the normal input of flip-flop BC2. Under these conditions, flip-flop BC1 goes to the "0" state, while flip-flop BC2 goes to the "1" state. As a result, output S1 of circuit 21 is no longer raised to a positive potential, while a positive potential appears at output S2.

It can thus be seen that, in cases where contact J1 is in the position shown in solid lines in FIG. 1, the read-in circuit 21 advances one step towards the right of the drawing each time it receives a pulse from contact J1 when the latter is in this position. Similarly, in cases where J1 is in the position indicated as a broken line in FIG. 3, circuit 21 advances one step towards the left of the drawing each time it receives a pulse via contact J1. Also, the pulses which are applied to circuit 21 via contact J2 serve to set the circuit to its initial state. It can thus be seen that, when a pulse is applied to circuit 21 via contact J2, when the latter has previously been set to the position shown in solid lines in FIG. 3, it travels on the one hand via mixer MN1 to the normal input of flip-flop BC1, which thus goes to the "1" state, and on the other hand, via mixers MC2 . . . MCn, to the complementary inputs of flipflops BC2 . . . BCn, which thus go to the "0" state. As a result, of all the outputs of circuit 21, only output S1 will be at a positive potential. Similarly, when a pulse is applied to circuit 21 via contact J2 when the latter has previously been set to the position shown as a broken line in FIG. 3, the said pulse travels on the one hand via Mn, to the normal input of flip-flop BCn, which thus goes to the "1" state, and on the other hand, via MC1, MC2, . . . MCn−1, to the complementary inputs of the other flip-flops, which thus go to "0" state. As a result, of all the outputs of circuit 21 only output Sn will be at a positive potential.

If FIG. 2E is now referred to, it can be seen that each of the rows of magnetic cores has passing through it on the one hand a respective one of the conductors B1 to B7 mentioned above on the other hand a respective one of seven conductors which are connected to respective ones of the outputs E1 to E7 of the read-out scanner circuit 22. In the example being described, this circuit is formed by a delay line of a known kind which has an input D and eight outputs E1, E1, . . . E8. In response to a triggering pulse applied to its input D, the delay line emits a series of 8 pulses spaced out in time, the first of these pulses being transmitted along the conductor connected to output E1 to initiate the extraction of the data bits recorded in the first row of magnetic cores, the second pulse being transmitted along the conductor connected to output E2 to initiate the extration of the date bits recorded in the second row of magnetic cores and so on. It should however be mentioned that the last pulse which appears at output E8 is not transmitted to the storage member 15, but is used to initiate operation as will be described below.

The characters which are to be printed by the printer 10 comes, in the form of combinations of binary digits, from a central unit 23 (FIG. 2C) which first transmits them, one by one, to a buffer store 24 (FIG. 2A). The characters so transmitted pass through a register 25 positioned at the input to store 24. The store 24 is intended to contain temporarily all the characters in a text which is to be printed. This store may be of the type described and illustrated in U.S. Pat. No. 3,378,819, the subject matter of which is hereby incorporated by reference. Without going into excessive details, it may be noted that store 24 is of the matrix type and that it contains a plurality of recording locations laid out in L rows and K columns. Each location is intended for the temporary storage of just one character. The locations are selected by means of two selection controlling members CSL and CSK which are connected to the store 24 and which are associated with the L rows and K columns respectively of the store. The selection controlling members are actuated by means of control pulses from a pulse generator GI or a differentiating and amplifier 26. The selection is performed, in a known fashion, under the control of two address indications respectively contained in a counter CL and a counter Ck (FIG. 2C). The counters CL and CK are connected to members CSL and CSK as shown in FIGS. 2A and 2C.

Referring to FIG. 2C, it can be seen that the output of counter CK is also connected to one of the inputs of a two-input comparator 27. The other input of comparator 27 is connected to the output of a register RK. Similarly, the output of counter CL is also connected to one of the inputs of a two-input comparator 27, and the other input of comparator 28 is connected to the output of register RL.

Register RK is intended to contain a number which is transmitted to it by the central unit 23. The number transmitted indicates the number of characters and spaces which are to be recorded in each of the rows of the buffer store 23. The transmission of this number to register RK takes place before the central unit 23 transmits the characters making up the text to be printed to the store 24. Similarly, register RL is intended to contain a number which is transmitted to it by the central unit 23 and which specifies the number of rows in the store 24 which are to be used to record in this store the text to be printed. The transmission of this number to register RL takes place before the characters making the text are transmitted by the central unit 23 to the store 24.

The function of the comparator 27 is to compare the numbers respectively contained in counter CK and register RK. The comparator 27 has two outputs marked $\neq$ and $=$ and is adapted to hold its $\neq$ output at a positive potential for as long as the numbers contained in CK and RK are different, and to bring its $=$ output to a positive voltage as soon as the number contained in counter CK becomes equal to that contained in register RK. Similarly, the function of comparator 28 is to compare the number respectively contained in counter CL and register RL. Comparator 28 has two outputs marked $\neq$ and $=$ and is adapted to hold its $\neq$ output at a positive potential for as long as the numbers contained in CL and RL are different, and to raise its $=$ output to a positive voltage as soon as the number contained in counter CL becomes equal to that contained in register RL.

FIG. 2C shows that three control circuits K1, K3, K5 are connected by their gating inputs to the $\neq$ output of comparator 27, and that three control circuits K2, K4, K6 are connected by their gating inputs to the $=$ output of comparator 27. Similarly, three control circuits K7, K9, K11 are connected by their gating inputs to the $\neq$ output of comparator 28, and three control circuits K8, K10, K12 are connected by their gating inputs to the $=$ output of comparator 28.

FIG. 2A also shows a detecting member 29 which is connected to the output of register 25 to detect whether or not the register is occupied. Detector 29 is adapted to hold its output at a positive potential for as long as register 25 contains a coded combination representing a character. Connected to the output of the detecting member 29 is differentiating amplifier 26. The differentiating amplifier 26 is designed to emit from its output a single pulse each time its input is raised to a positive potential i.e., as will be seen below, each time a character is recorded in register 25.

The operations involved in the recording, in buffer store 24, of the characters making up the text intended for printing will now be described. It will be assumed that the counters CK and CL are initially at zero and that, under these conditions, the location in store 24 which is selected by the selection controlling members CSK and CSL is the first location in the first row of locations in the store, that is to say the location situated in the top left-hand corner of the block which represents store 24 in FIG. 2A. After having transmitted to registers RK and RL the two numbers mentioned above (the numbers which specify on the one hand the number of characters or spaces to be recorded in each row in the store 24 and on the other hand the number of lines of characters to be recorded in the store) the central unit 23 then transmits the first character of the text intended for printing to register 25. The arrival of this first character in register 25 is detected by detecting member 29. The positive voltage which then appears at the output of detecting member 29 is applied to the input of the differentiating amplifier 26, which in turn emits a pulse. This pulse is applied on the one hand, via mixing circuit M10, to the input of a delay member R1, and on the other hand to the selection controlling members CSK and CSL, as well as to a gate 30 arranged between register 25 and store 24. Reference to a detailed explanation of the manner of operation can be found in the above noted U.S. Pat. No. 3,378,819. Here, it will merely be mentioned that the effect of applying the pulse to members CSK and CSL is to cause the character contained in register 25 to be recorded in store 24. This character is recorded in the first location in the first row of locations in store 24. The delayed pulse, which then appears at the output of delay member R1, is applied on the one hand to register 25 to reset it to zero, and on the other hand to the gated inputs of control circuits K1 and K2 (FIG. 2C). It should be noted that delay member R1 is so arranged that register 25 is not reset to zero until the recording in store 24 of the character contained in register 25 has been completed. Owing to the fact that counter CK is at zero while register RK, which was loaded initially by the central unit 23, is not, the output of comparator 27 which is raised to a positive potential is the $\neq$ output. Because of this, circuits K1, K3, K5 are conductive while circuits K2, K4, K6 are nonconductive. As a result, the pulse which is transmitted by member R1 and which reaches the gated inputs of K1 and K2 is blocked by K2 and transmitted by K1, which applies it, via a mixing circuit M11, to counter CK. Because of this, the content of counter CK is increased by one unit. As a result, the location in store 24 which is now selected by the selection controlling member CSK and CSL is the second location in the first row of locations in the store. If the central unit 23 now transmits the second character of the text intended for printing to register 25, the said second character will be recorded in the second location in the second row, in a manner similar to that described. The pulse which is applied to the inputs of K1 and K2 when this recording has been completed is transmitted by K1, which transmits it to counter CK via M11. Because of this the content of counter CK increases by one unit. As long as the number contained in this counter is less than that contained in register RK the characters which are successively transmitted by the central unit 23 to register 25 are recorded in store 24 in the manner just described, the recording taking place in the first row of locations in store 24. It should be noted that, whenever a space separating two consecutive words is to be recorded in store 24, the central unit 23 applies a pulse, via a conductor FE and the mixing circuit M10, to the input of delay member R1. The delayed pulse which then appears at the output of R1 is applied, on the one hand to register 25, which thus remains at zero, and on the other hand to the inputs of control circuits K1 and K2. This pulse, when transmitted by K1, is applied to counter Ck, which thus moves up one unit, which prevents the character which is then transmitted by the central unit 23 from being recorded at the location in the store 25 immediately following that at which the previous character was recorded.

When, because of the pulses applied to counter CK via circuit M11, the number contained in the said counter becomes equal to that contained in register RK, the $\neq$ output of comparator 27 ceases to be at a positive potential and a positive voltage appears at the $=$ output of the comparator. Under these conditions, the control circuits K2, K4, K6 become conductive, while circuits K1, K3 and K5 become non-conductive. If, after this time, a delayed pulse appears at the output of R1, this pulse, which is applied to the gated inputs of K1 and K, is only transmitted by K2, which applies it on the one hand via a mixing circuit M12 to counter CK, which thus returns to zero, and on the other hand to the gated inputs of control circuits K7 and K8. If the number contained in counter CL is less than that contained in register RL, the output of comparator 28 which is raised to a positive potential is the ≠ output. In this case, control circuits K7, K9, K11 will be conductive while circuits K8, K10, K12 will be non-conductive. The pulse which is transmitted by K2 and applied to circuits K7 and K8 is thus transmitted by K7, which applies it, via a mixing circuit M13, to counter CL. Because of this, the content of counter CL increases by one unit. As a result, the row of locations in store 24 which is selected by the selection controlling member CSL is the second row.

Given that, as seen above, counter CK has been reset to zero, the column of locations in store 24 which is selected by selection controlling member CSK is the first column. This being the case, the location in store 24 which is now selected by members CSK and CSL is the first location in the second row. By reasoning along the lines given above, it will thus be realized that the characters which, as of this moment, are transmitted by the central unit 23 to register 25, are recorded in the second row of locations in store 24. The recording continues until such time as the number contained in counter CK again equals that contained in register RK. The delayed pulse which appears subsequent to this moment at the output of R1 and which is applied to circuits K1 and K2 is transmitted by K2, which applies it to circuits K7 and K8. If the number contained in CL is less than that contained in R1, the said pulse is transmitted by K7, which applies it, via M13, to counter CL, which thus advances one unit. Because of this, the row of locations in store 24 which is now selected by member CSL is the third row. As of this moment, the characters which are transmitted by the central unit to register 25 are recorded in the third row of location in store 24. This recording continues until such time as, counter CL having moved up a further unit the fourth row is selected. It can thus be appreciated that the recording in store 24 of the characters which are successively transmitted by the central unit 23 takes place row by row the changeover from one row to the next takes place when the recording of all the characters or spaces to be recorded in the row which has been selected has been completed, the number of characters or spaces recorded in this row then being equal to the number which is contained in register RK. The recording in store 24 of the characters and spaces making up the text to be printed continues until such time as the numbers contained in counters CK and CL become equal to those contained in register RK and RL respectively. At this moment, of all the control circuits K1 to K12, only circuits K2, K4, K6, K8, K10 and K12 are conductive. The delayed pulse which then appears at the output of R1 which is applied to circuits K1 and K2 is transmitted by K2, which applies it on the one hand to counter CK, which thus returns to zero, and on the other hand to circuits K7 and K8. This pulse is transmitted by K8, which applies it on the one hand via a mixing circuit M14 to counter CL, which returns to zero, and on the other hand to the normal input of a flip-flop BAL (FIG. 2A) which thus goes to the "1" state. The same pulse is also applied on the one hand to the input of a delay member R2 (FIG. 2C), and on the other hand, via a mixing circuit M15 (FIG. 2D), and the changeover contact J2, to the scanning circuit 21 (FIG. 2E). In the present case it will be assumed that all the changeover contacts in the diagram shown in FIGS. 2A to 2E have previously been set to the positions shown in solid lines in these Figures. As will be seen below, this position enables line by line printing of the text which has been recorded in store 24 to be obtained. In this case, as was explained in detail above, the output of circuit 21 which is raised to a positive potential is output S1. Also, since flip-flop BAL is now in the "1" state, a control circuit K13 (FIG. 2A), whose gating input is connected to the normal output of flip-flop BAL, is made conductive. The delayed pulse which then appears at the output of R2 is applied, via a mixing circuit M16, to the gated input of circuit K13 which, being conductive, applied it to the normal input of a flip-flop BCE. The latter then goes to the "1" state and the positive voltage which thus appears at its normal output is applied to the input of the pulse generator GI.

The pulse generator GI is arranged in a known fashion to emit pulses from its output for as long as its input is held at a positive potential. The first of these pulses is applied on the one hand to the input of a delay member R3 and on the other hand to the selection controlling members CSK and CSL to initiate the extraction from the store 24 of the character which is recorded in that location in the store which is defined by the two address indicators contained in counters CK and CL respectively. Given that, as explained above, the counter CK and CL are now at zero, the character which is thus extracted from store 24 is that which was recorded in the first location in the first row of locations in the said store. When extracted from the memory this character, which is represented by a binary coded combination, is transmitted to the decoding register 20 (FIG. 2D) which is connected to the output of store 24 by a cable P. It should be mentioned here that the decoding register 20 has the same number of outputs, such as those which are marked SA, SB, SC, SZ in FIG. 2D, as these are possible kinds of character to be printed. It will be assumed that the number of possible kinds of character is equal to k and that because of this the decoding register has k outputs. The decoding register 20 is adapted to raise one of its k outputs to a positive potential whenever it receives a binary coded combination which has been extracted from store 24, the output in question being that which corresponds to the character represented by the said combination. Thus, if for example the binary combination contained in the decoding register 20 has been agreed upon as representing the character A, the output of the register which is raised to a positive potential is output SA. Similarly, if the said binary combination is the agreed symbol for the character B the output which is raised to a positive potential is output SB, and so on. Each of the outputs of the decoding register 20 has connected to it a group of m control circuits, this group containing, in the embodiment being described, seven control circuits. However, for reasons of simplicity, all that are shown in FIG. 2D are the seven control circuits KA1 to KA7 which are connected to output SA, and two (KB1, KB2) of the seven control circuits connected to output SB. The pulses which are applied to the gated inputs of the control circuits come from a delay line 31 having eight intermediate tappings which, from a pulse which is applied to its input via a conductor F, produces a series of eight pulses spaced out in time, the first of these pulses being transmitted, via a conductor F1, to circuits KA1, KB1, etc., the second of these pulses being transmitted, via a conductor F2, to circuits KA2, KB2, etc., and so on for the other pulses, except for the eight pulses whose function will be described below. Since decoding register 20 has k outputs, altogether there are thus k groups of control circuits connected to the said outputs, each group containing m control circuits. It should be mentioned that the data bit generator 16 has km inputs, that the data bit generator 17 has kp inputs (kp being less than km) and that each of the inputs of generator 16 can be connected, via a respective changeover contact I (FIG. 2B), to the output of a respective one of the km control circuits. Similarly, each of the kp inputs of generator 17 can be connected, via a respective one of the changeover contacts I, to the output of a respective one of the first p control circuits in each group, these circuits being circuits KA1 to KA5, KB1 to KB5, etc. in the case illustrated by 2D.

Bit generator 16 has p outputs, bit generator 17 has m outputs and, in the embodiment being described, the generators are each formed by a 2-dimensional matrix memory in which words are recorded. Each of these words contains, in the case of memory 16, p (i.e. 5) bits, and, in the case of memory 17, m (i.e. 7) bits. In the embodiment being described it will be assumed that the memories 16 and 17 are both of the kind which is described and illustrated in U.S. Pat. No. 3,219,234, the subject matter of which is hereby incorporated by reference. Memory 17 having, for the storage of kp words each of m bits, a set of m ferrite rods arranged parallel to one another in the same plane, each of these rods being provided with a multi-turn secondary winding, and a number kp of primary windings extending in a direction perpendicular to the rods, each primary winding having singleturn couplings to certain of the m rods and being connected, via a changeover contact I, to the output of a respective one of the kp control circuits connected to the outputs of decoding register 20 so that, when any one of the primary windings is energized by a pulse transmitted by the control circuit connected to it, a voltage pulse appears only at the terminals of the secondary windings of those rods which are magnetically coupled to the said primary winding, these pulses being transmitted to the storage member 15 via conductors B to Bm (i.e. B1 to B7 in the embodiment being described). The make-up memory 16 is similar to that of memory 17 except that it has p ferrite rods and km primary windings having single-turn couplings to certain of the p rods, each of these windings being connected to the output of a respective one of the km control circuits connected to the outputs of decoding r register 20. The voltage pulses which appear at the terminals of the secondary windings of these rods are transmitted to the storage member 15 via conductors B1 to Bp (i.e. B1 to B5 in the embodiment being described). The combination formed by the delay line 21 and the km control circuits which are connected to it via conductors F1 to Fm (i.e. F1 to F7) in the embodiment being described) forms the energization controlling member 18 discussed above.

A description will now be given of what happens from the moment when, in response to the first pulse transmitted by generator GI (FIG. 2A), the first character, after being extracted from the first location in the first row of store 24, has reached the decoding register 20 in the form of a binary coded combination. Because the character has been recorded in decoding register 20, one of the outputs of the register will be at a positive potential. As an example it will be assumed that this output is the one marked SA.

The first pulse transmitted by GI, also having been applied to the input of delay member R3, the delayed pulse which then appears at the output of R3, is transmitted on the one hand to the delay line 31 and on the other hand, via a changeover contact G which is initially set to the position shown in FIG. 2C, to the gated inputs of circuits of K3 and K4. Since the contents of CK and RK are different, this pulse is transmitted by K3, which applies it, via M11, to counter CK, which thus advances by one unit. This being the case, the location in store 24 which is selected by CSK and CSL is now the second location in the first row in the store. Also, in response to the pulse applied to its input, the delay line 31 emits a series of eight pulses. The pulse which is transmitted along conductor F1 is applied on the one hand, via a mixing circuit M17, to the input of a delay member R4, and on the other hand is transmitted by KA1 which applied it, via the appropriate changeover contact I, to one of the inputs of memory 17. The application of this pulse causes seven "0" or "1" data bits to be transmitted along conductors B1 to B7 in the form of pulses. Given that, as indicated above, the output of the scanning circuit 21 which is raised to a positive potential is output S1, these seven data bits are recorded in cores T11, T21, . . . T71 of the storage member 15, that is to say the cores forming the first column in this member. The delayed pulse which then appears at the output of R4 is applied, via changeover contact J1 which has previously been set to the position indicated in FIG. 2E, to the scanning circuit 21, which thus advances one step to the right and thus raises its output S2 to a positive potential. In a similar way, the pulse which is transmitted by delay line 31 along conductor F2 is on the one hand applied, via M17, to the input of R4 and on the other hand is transmitted by KA2, which applied it, via the appropriate changeover contact I, to another input of memory 17. As a result, seven other data bits are transmitted by the said memory to member 15 via conductors B1 to B7. These other seven data bits are recorded in cores T12, T22, T72 of member 15, that is to say the cores making up the second column in this member. The delayed pulse which then appears at the output of R4 is applied, via J1, to circuit 21, which thus advances one step further to the right and raises its output S3 to a positive potential. The operations triggered by the pulses which are transmitted along conductors F3, F4 and F5 will not be described since they are similar to those which have just been dealt with. It will merely be mentioned that these three pulses cause memory 17 to transmit three groups of seven data bits in succession, each of these three groups thus being recorded in a respective one of three following columns of member 15, these columns being, respectively, the third, fourth and fifth of the columns in this member. The delayed pulse which appears at the output of R4 as soon as this recording operation is completed is applied, via J1, to circuit 21, which again advances one step to the right and raises its output S6 to a positive potential. Given that the changeover contacts I are all in the positions shown in FIG. 2B, the pulses which are transmitted by the delay line 31 along conductors F6 and F7 are not applied to memory 17. However, these two pulses, having been delayed by R4, are applied to the circuit 21, which thus advances two steps to the right. Finally, the pulse which is transmitted by delay line 31 along conductor F8 is applied on the one hand to the input of a delay member R5 and on the other hand, via M17, to the input of R4. This pulse cannot however be applied to the input of a delay member R6 (FIG. 2D) owing to the fact that a contact H situated at the input to this member has previously been set to the open position. The delayed pulse which then appears at the output of R4 is applied, via J1, to circuit 31, which advances one step to the right and thus raises its output S9 to a positive potential. After this, the delayed pulse which appears at the output of R5 is applied to the decoding register 20 and causes it to be reset to zero. From the detailed explanation which has just been given it will be appreciated that the first pulse which was transmitted by generator GI caused five groups of seven data bits to be recorded in the first five columns of cores in the storage member 15.

Figure 4:
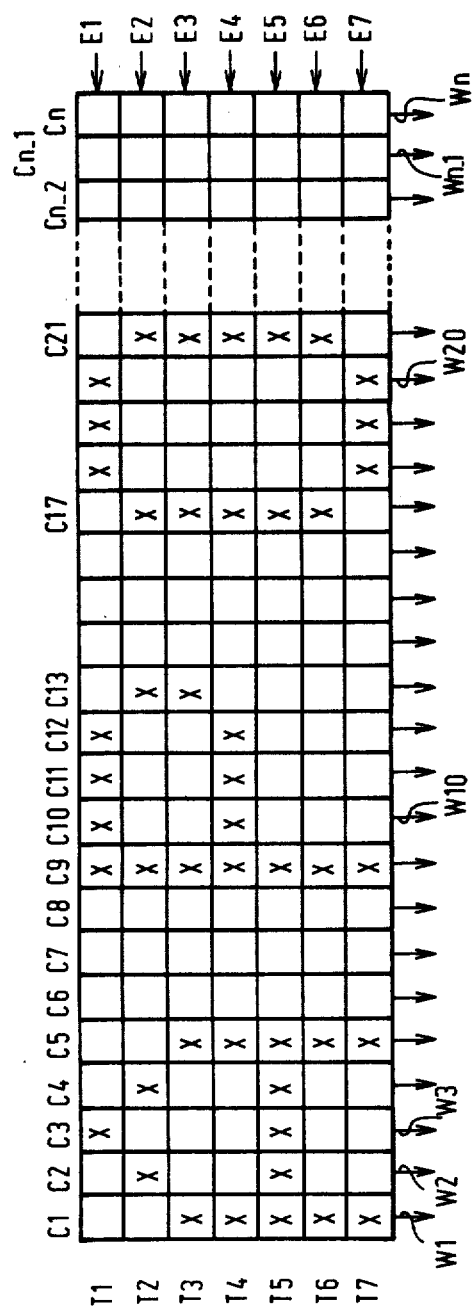
FIG. 4 shows the state of the storage member of the arrangement of FIG. 1, after is has been loaded by the data bit generators in a first mode of operation.
Figure 5:
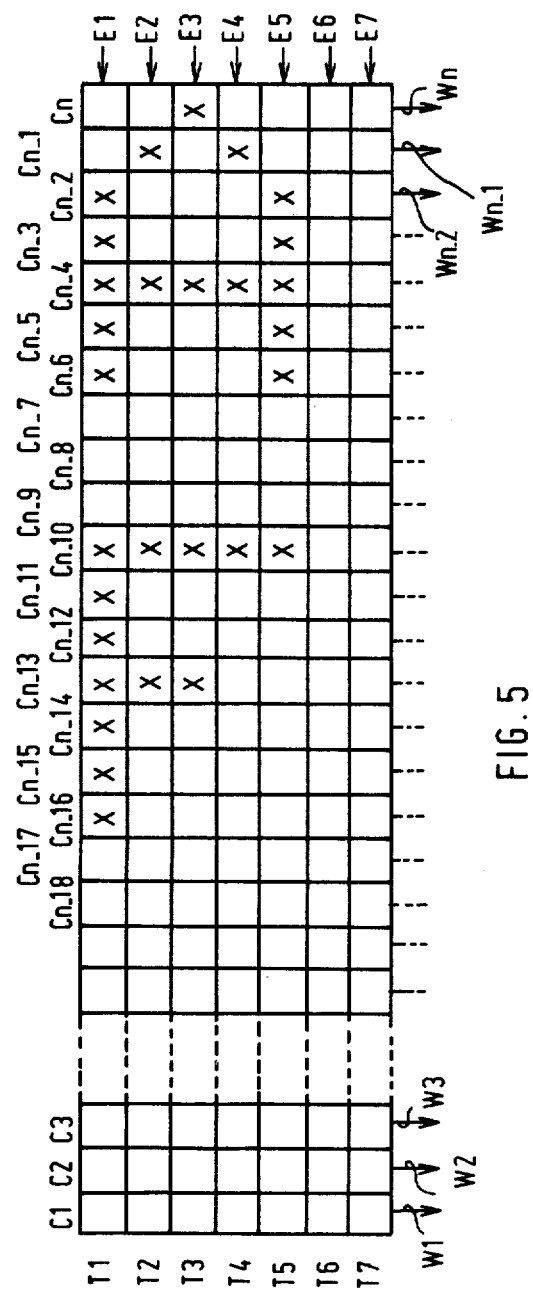
FIG. 5 shows the state of the storage member of the arrangement of FIG. 1, after it has been loaded by the data bit generators in a second mode of operations.

Referring to FIG. 4, these first five columns are marked C1, C2, C3, C4 and C5. Similarly, given that the output of circuit 21 which is now at a positive potential is output S9, the second pulse which is transmitted by generator GI causes five other groups of seven data bits to be recorded in the five columns C9, C10, C11, C12 and C13 in the storage member 15, no recording having taken place in columns C6 to C8. Similarly, the third pulse which is transmitted by generator GI causes five groups of seven data bits to be recorded in columns C17, C18, C19, C20 and C21 in member 15, and so on.

The recording of groups of data bits in member 15 ceases when, counter CK having advanced by one unit each time a character was extracted from memory 24, the number contained in it becomes equal to that contained in register RK. At this moment K4 becomes conductive and C3 ceases to be conductive and the delayed pulse which appears at the output of R3 and which applied, via contact G, to circuits K3 and K4 is transmitted by K4. The pulse which is transmitted by K4 is applied on the one hand, via M12, to counter CK, which thus returns to zero, and on the other hand the circuits K9 and K10. Owing to the fact that the numbers contained in CL and RL are different, the pulse which is applied to circuits K9 and K10 is only transmitted by K9, which applied it, via M13, to counter CL which thus advances by one unit. Because of this, the location in memory 24 which is now selected by CSK and CSL is the first location in the second row in this memory. However, the character which is contained in this location is not extracted from the memory at this time, given that the pulse which was transmitted by K4 was also applied, via a mixing circuit M18, on the one hand to the complementary input of flip-flop BCE which, by returning to O, now prevents generator GI from transmitting pulses, and on the other hand to input D of delay line 22. It should however be noted that, at the time when this pulse is applied to input D of line 22, the state in storage member 15 is that which is shown by way of example in FIG. 4. In this Figure, the storage elements, that is to say the magnetic cores, are indicated diagrammatically by squares and the cores in which "1" data bits have been recorded are marked with a cross. It can thus be seen from FIG. 4 that together, the magnetic cores in which "1" bits have been recorded form images of the characters which are to be printed, and that, in the example illustrated in FIG. 4, the bits form the images of the three characters A, P and O.

A description will now be given, with reference to FIGS. 2E and 4, of the various phases of operation during which the characters making up the first print line are formed on the magnetic drum 11 by the recording member 13. In response to the pulse which it receives at its input D, the delay line 22 transmits from its output E1 a first pulse to row T1. The "1" data bits recorded in the magnetic cores in row T1, that is to say cores T11, T12, ... T1n are thus extracted from these cores and are transmitted, in the form of pulses, along conductors, W1, W1, ... Wn. Thus, in the example illustrated in FIG. 4, pulses will be transmitted along the conductors W3, W9 to W12, and W18 to W20 which are associated with columns C3, C9 to C12 and C18 to C20 respectively. Each of these pulses causes a magnetized dot to be formed on the drum 11. The delay line 22 then transmits, from its output E2, a second pulse to row T2, which causes pulses to be transmitted along the conductors W2, W4, W9, W13, W17 and W21 which are associated with columns C2, C4, C9, C13, C17 and C21 respectively. In the same way it will be appreciated that the third pulse transmitted by line 22 causes pulses to be transmitted along conductors W1, W5, W9, W13, W17 and W21. The third pulses transmitted by 22 causes pulses to be transmitted along conductors W1, W5, W9 to W12, W17 and W21. The fifth pulse transmitted by 22 causes pulses to be transmitted along conductors W1 to W5, W9, W17 and W21. The sixth pulse transmitted by 22 causes pulses to be transmitted along conductors W1, W5, W9, W17 and W21. The seventh pulse transmitted by 22 causes pulses to be transmitted along conductors W1, W5, W9 and W18 to W20. At this moment the three characters A, P and O have been recorded in the form of magnetized dots on the drum 11. The eighth pulse which then appears at output E8 of delay line 22 is applied, as can be seen if FIGS. 2A to 2E are joined together, on the one hand, via mixing circuit M15 and the changeover contact J2 which is set to the position indicated in FIG. 2E, to the scanning circuit 21 which thus raises its output S1 to a positive potential again, and on the other hand to the gated input of a control circuit K14 and, via mixer M16, to the gated input of circuit K13. Due to the fact that flip-flop BAL is in the "1" state, circuit K14, which is connected via its gating input to the complementary output of flip-flop BAL, is non-conductive and thus blocks the pulse which it receives, while circuit K13, which is connected by its gating input to the normal output of the said flip-flop, is conductive. The pulse which is supplied to K13 is thus transmitted by it and is applied to the normal input of flip-flop BCE, which thus goes to the "1" state again. A positive voltage then appears at the normal output of BCE. This voltage, when applied to the input of generators GI, causes the generator to transmit more pulses. These pulses cause the characters contained in the second row in the store to be extracted one by one, the storage elements of member 15 to be refilled and then, when all the characters in the second row have been extracted, the data bits which have been temporarily stored in member 15 to be transmitted to member 13, these bits thus causing a second row of characters to be recorded, in the form of magnetized dots, on the drum 11. The recording of subsequent lines of characters on the drum takes place in a similar way to that described above and for this reason the operations involved will not be dealt with in detail. It will merely be mentioned that the delayed pulse which appears at the output of R3 just after the extraction of the final character recorded in the store 24 is transmitted on the one hand to the delay line 31, thus causing the final five groups of seven data bits to be recorded in the storage member 15, and on the other hand, via contact G which is set to the position shown in FIG. 2C, to the gated inputs of circuits K3 and K4. Given that the numbers contained in counters CK and CL are now equal to those contained in registers RK and Rl respectively, circuits K2, K4, K6 K8, K10 and K12 are conductive, while circuits K1, K3, K5, K7, K9 and K11 are nonconductive. This being the case, the pulse which is applied to circuits K3 and K4 is transmitted by K4, which applies it on the one hand, via M12, to counter CK which thus reverts to O and on the other hand to circuits K9 and K10. The pulse which is transmitted by K4 is also applied, via M18, on the one hand to the complementary input of flip-flop BCE, which thus reverts to O and prevents generator GI from then transmitting pulses, and on the one hand to input D of delay line 22, which triggers the recording, in the form of magnetized dots, of the final line of characters on the magnetic drum 11. Circuit K10 also transmits the pulse which it receives and applies it via M14 to counter CL, which thus returns to O. The pulse transmitted by K10 is also applied, via a mixing circuit M19 (FIG. 2C), on the one hand to registers Rk and RL, which thus return to O, and on the other hand to the complementary input of flip-flop BAL which thus returns to O. Because of this, circuit K14 becomes conductive while circuit K13 becomes nonconductive. The pulse which then appears at output E8 of delay line 22 at the conclusion of the recording of the final line of characters on the drum 11 is applied on the one hand, via M15 and the changeover contact J2 which is set to the position shown in FIG. 2E, to the scanning circuit 21, which thus again raises its output S1 to a positive potential, and on the other hand to the gated inputs of K13 and K14. This pulse, which is blocked by K13, is transmitted by K14 which transmits it, as can be seen from FIGS. 2A, 2B and 2C, to the central unit 23 to notify it of the completion of the recording on drum 11 of the characters making up the text which was temporarily stored in store 24. As of this moment, the central unit 23, having again loaded registers RK and Rl, is able to transmit to store 24 the successive characters making up another text to be recorded on the drum 11, the operations of storing the characters in the said store and then of recording them on the drum being similar to those described in detail above.

As an example, FIG. 6 shows a text which has been printed on a recipient strip of paper by the printing machine 10 with the machine operating in the printing mode described above, that is to say the line-by-line printing mode, the strip having been shifted in the direction X in the course of printing. FIG. 7 shows how the same text appears when the printing machine is operated in the column-by-column printing mode. To operate in this second mode, which is now to be described, it is merely necessary to set beforehand all the contacts I, J1, J2, G and H to the positions shown in broken lines in FIGS. 2B, 2C, 2D, 2E.

Contacts I, J1, J2, G and H having been set in this way, the store 24 is loaded with characters and spaces which are transmitted in succession by the central unit 23 in the same way as was described above. It should however be mentioned that at the end of the operation of loading the store 24, the counters CK and CL are reset to zero and flip-flop BAL is set to the "1" state by a pulse transmitted by K8. The pulse transmitted by K8 is also applied on the one hand to the input of R2 and on the other hand via M15 and J2, to the scanning circuit 21. However, because contact J2 has previously been set to the position indicated in broken lines in FIG. 2E, the pulse which is thus applied to the said circuit has the effect of raising output Sn to a positive voltage. The delayed pulse which then appears at the output of R2 is applied, via M16, to circuit K13 which, being conductive, applied it to the normal input of flip-flop BCE. This flip-flop thus goes to "1", which triggers off the transmission of pulses by generator GI. The first pulse transmitted by GI is applied on the one hand to the input of R3 and on the other hand to members CSK and CSL. Because of this the character contained in the first location in the first row in store 24 is extracted and is transmitted to decoding register 20. The delay pulse which then appears at the output of R3 is applied on the one hand to delay line 31 and on the other hand via G which is set to the position showing broken lines in FIG. 2C, to circuits K11 and K12. In response to the pulse which it receives, delay line 31 emits in succession along conductors F1 to F7 seven pulses which are transmitted, via contacts I, to memory 16, which then transmits seven groups of five data bits to the storage member 15. These seven groups are thus recorded in the seven columns Cn, Cn - 1, Cn - 2, . . . Cn - 6 in member 15. The pulse which is transmitted by 31 along conductor F8, having been delayed by R4, is applied, via J1, to circuit 21, which thus advances one step to the left. Owing to the fact that contact H is closed, the pulse transmitted along conductor F8 is also applied to the input of R6. The latter then emits a delayed pulse which is applied on the one hand to the input of a delay member R7 and on the other hand, via M17, R4 and J1, to the circuit 21, which again advances one step to the left. Finally, the delayed pulse which appears at the output of R7 is applied, via M17, R4 and J1, to the circuit 21, which advances a further step to the left. The column in member 15 which is thus selected by circuit 21 is column Cn - 10. In addition, the pulse which, as stated above, is applied to circuits K11 and K12, is transmitted by K11 which applied it, via M13, to counter CL, the content of which thus increases by one unit. As a result the location in store 24 which is now selected by CSK and CSL is the first location in the second row in the store. The character contained in this location is extracted when a second pulse is transmitted by GI, this second pulse, having been delayed by R3, then causing seven other groups of five data bits to be recorded in the seven column Cn - 10 to Cn - 16 in member 15 (see FIG. 5). In a similar way, the third pulse transmitted by GI causes seven groups of five data bits to be recorded in columns Cn - 20 to Cn - 26 in member 15, and so on. The recording of groups of five bits in member 15 ceases when the number contained in counter CL becomes equal to that contained in register RL. The delayed pulse which appears after this moment at the output of R3 and which is applied to circuits K11 and K12 is transmitted by K12, which transmits it, via M14, to counter CL, which thus returns to zero. The pulse transmitted by K12 is also applied to circuits K5 and K6 but is only transmitted by K5, which passes it on to counter CK. This counter thus advances by one unit and the location in memory 25 which is now selected CSK and CSL is therefore the second location in the first row of the said memory. However, the pulse transmitted by K12 is also applied, via M18, on the one hand to the complementary input of BCE which by returning to zero, prevents GI from transmitting pulses, and on the other hand to the input D of delay line 22. The delay line then initiates the recording, on the drum 11, of the characters whose images are formed by the "1" data bits which have been recorded in member 15. In the example being described, it will be assumed that these characters are the characters A, F and D. Thus, if reference is made to FIG. 5 in which, for reasons of simplicity, are shown only the magnetic cores in which have been recorded the bits corresponding to the characters A and F, it can be seen that the images of these characters lie at 90° to the images which were formed by the "1" data bits in the case of line by line printing (FIG. 4). It can also be seen that the characters A, F and D which are now recorded on the drum 11 are the first characters in the words APODE, FORTE and DOSER which have been recorded in the first three rows in store 24. When the recording of these three characters on the drum 11 has been completed, a pulse appears at output E8 of delay line 22 and on the one hand causes the scanning circuit 21 to be set in such a way that its output Sn is again raised to a positive potential, and on the other hand causes flip-flop BCE to change over to "1", which causes pulse generator G1 to begin emitting pulses again. These pulses cause the characters contained in the second column of the memory to be extracted one by one, the storage elements of member 15 to be re-loaded and then, when all the characters in the second column have been extracted, the data bits which were stored temporarily in member 15 to be transmitted to member 13. These bits thus cause a second line of characters to be recorded on the drum 11 in the form of magnetized dots, these characters being, in the example illustrated in FIG. 7, the second characters P, O and O in the three words mentioned above. The recording of subsequent lines of characters on the drum 11 takes place in a similar way to that described below and for this reason the operations involved will not be described in detail. It will merely be mentioned that the delayed pulse which appears at the output of R3 just after the extraction of the final character recorded in memory 24 is transmitted on the one hand to the delay line 31, which causes the recording of the final seven groups of five data bits in member 15 to begin, and on the other hand, via G, to circuits K11 and K12. Given that circuits K2, K4, K6, K8, K10 and K12 are now conductive and that circuits K1, K3, K5, K7, K9 and K11 are nonconductive, the pulse which arrives at K11 and K12 is transmitted only by K12, which applies it on the one hand via M14 to counter CL, which thus returns to zero, and on the other hand to circuits K5 and K6. The pulse transmitted by K12 is also applied, via M18, on the one hand to the complementary input of BCE, which thus returns to zero and thereby blocks generator GI, and on the other hand to input D of delay line 22, which causes the recording of the final line of characters to begin on the drum 11 in the form of magnetized dots. Also, circuit K6 transmits the pulse which it receives and applies it, via M12, to counter CK, which resets the zero. The pulse transmitted by K6 is also applied, via M19, on the one hand to registers RK and RL, which thus return to zero, and on the other hand to BAL, which then goes to "0" and this makes K14 conductive and K13 nonconductive. This being the case, the pulse which, at the conclusion of the recording on the drum of the final line of characters, appears at output E8, is applied on the one hand, via M15 and J2, to circuit 21 which then raises its output Sn to a positive potential again, and on the other hand to the gated inputs of K13 and K14. This pulse is only transmitted by K14, which feeds it to the central unit 23 to notify the unit that the recording on the drum 11 of the characters which were stored temporarily in store 24 has been completed.

Figure 8B:
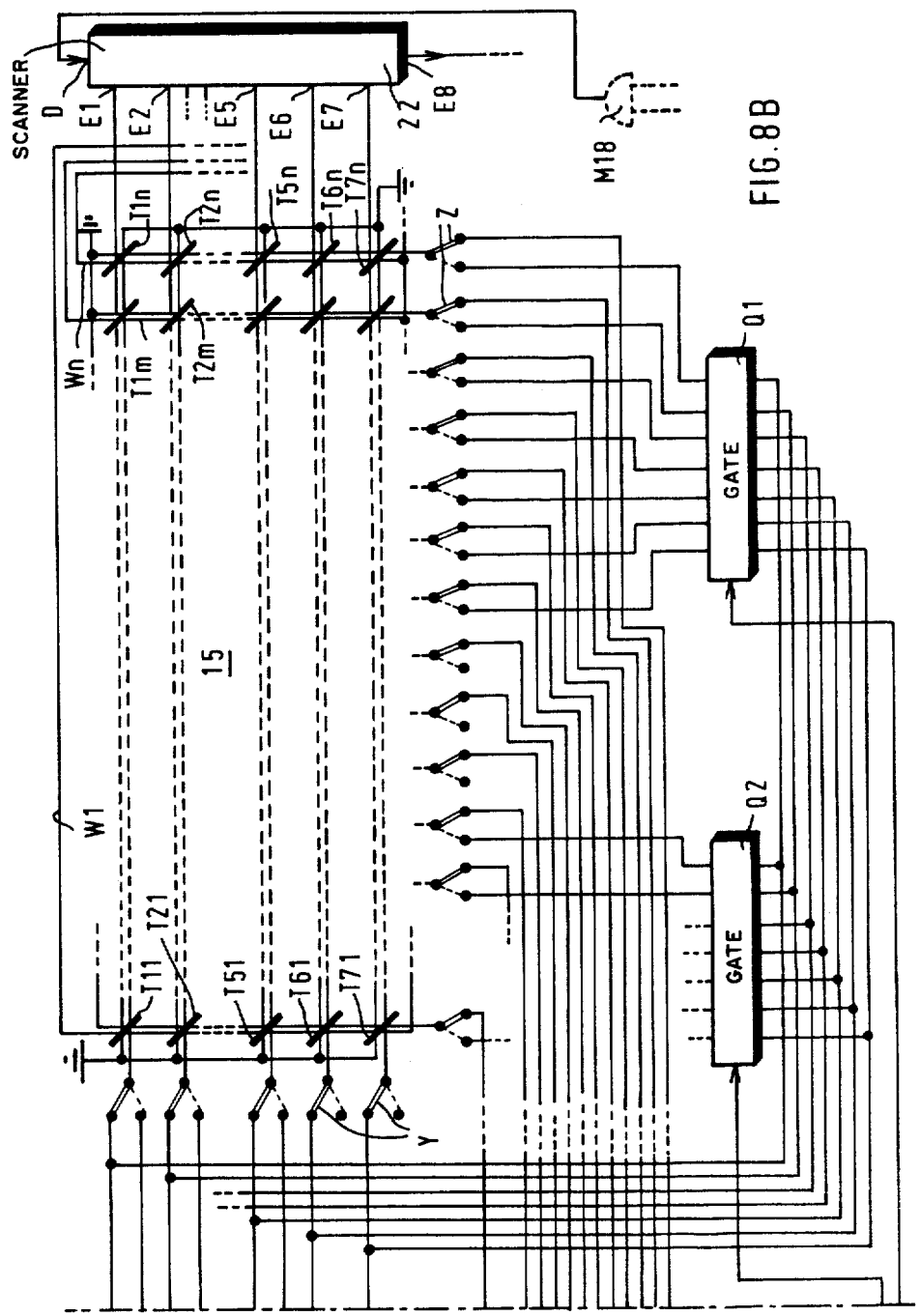

The recording control arrangment which has just described may of course be constructed in a different way from that shown in FIGS. 2A to 2E. FIGS. 8A and 8B, when joined together on the chain line, show by way of example how the layout shown in FIGS. 2A and 2E could be modified in a case where only a single bit generator, namely bit generator 17, was used, generator 16 being dispensed with. As can be seen from these Figures, the data bits which are transmitted along conductors B1 to B7 in response to the pulses transmitted to generator 17 by the energization controlling member 18 are applied either to the rows in the storage member 15, via changeover contacts Y, or to groups of m (i.e. 7) columns in member 15, via one of a series of g gates Q1, Q2, . . . Qq, and changeover contacts Z, q being the maximum number of characters which can be recorded in one line on the drum 11. When gate Q1 is made conductive and the contacts Z are set to the positions shown in broken lines in FIG. 8B, the data bits transmitted by the gate are fed to columns Cn to Cn - 6 in member 15. Similarly, when with the contacts Z in the same position, gate Q2 is made conductive, the data bits transmitted by this gate are fed to columns Cn - 10 to Cn - 16 in member 15. With the contacts Z so positioned, the bits transmitted by gate Q3 are fed to columns Cn - 20 to Cn - 26, and so on. When on the other hand the contacts Z are in positions indicated in solid lines on the Figure, columns C1 to Cn of member 15 are connected to outputs S1 to Sn respectively of the scanning circuit 21. The gates Q1 to Qq are selected by gate selector 33 which has q outputs each connected by one of q conductors V1, V2, . . . Vq to a respective one of the gates Q2 to Qq, this selector being adapted to raise only one of its outputs to a positive potential and thus to make the gate Q connected to this output conductive. The application to the selector 33 of a pulse transmitted by control circuit K8 has the effect of rendering gate Q1 conductive. The selector 33 is also able to receive the pulses which are transmitted along conductor F6 by delay line 31 from the energization controlling member 18. Each time a pulse transmitted along conductor F6 arrives at selector 33, the latter advances one step and renders the next gate Q conductive. Thus, the first pulse transmitted along F6 renders gate Q2 conductive, gate Q1 then becoming nonconductive. The second pulse transmitted along F6 renders gate Q3 conductive while gate Q2 becomes nonconductive, and so on.

FIGS. 8A and 8B also show that, when the changeover contacts Y are set to the positions shown in solid lines, the data bits transmitted along conductors B1 to B7 are applied to rows T1 to T7 of the storage member 15, whereas when the contacts Y are in the positions shown in broken lines rows T1 to T5 are connected, via conductors N1, N2, N3, etc. to the p outputs of a row selector 32. In the example being considered where p was made equal to five, the selector 32 have five outputs and is adapted to raise only one of its outputs to a positive potential. It may be mentioned that, when the selector receives a positive pulse transmitted by circuit K8 at its input 34, it raises the output to which conductor N1 is connected to a positive voltage. At its input 35, the selector 32 is also able to receive the pulses which, having been transmitted by member 18 along conductors F1 to D5, are then delayed by a delay member R8. Each time one of these pulses arrives at input 35 of selector 32, the latter advances one step and thus raises the next to a positive potential. Thus, the first of these pulses causes a positive voltage to appear at the output to which conductor N2 is connected, while the output connected to conductor N1 ceases to be at a positive potential. Similarly, the second pulse causes a positive voltage to appear at the output connected to conductor N3, while the output connected to N2 then ceases to be at a positive potential, and so on.

FIG. 8A also shows that the pulses transmitted by K8 are likewise applied to the scanning circuit 21, the effect of each of these pulses thus being to cause a positive potential to appear at output S1 of the said circuit. It can also be seen from FIG. 8A that the pulses transmitted along conductors F1 to F5, having been delayed by R8, are applied to circuit 21 and that the pulses transmitted along conductors F6, F7, F8 are likewise applied to circuit 21, after being delayed by a delay member R9. The scanning circuit 21 advances one step each time it receives a pulse which has been transmitted along one of the conductors F1 to F8. It should also be mentioned that, in cases where characters are to be printed line by line, the changeover contacts Y and Z occupy the positions shown in solid lines in FIG. 8B. In this case, the selectors 32 and 33, and the gates Q1, Q2, . . . Qq do not perform any function and the groups of data bits (each of seven bits) which are transmitted by generator 17 to member 15 via conductor B1 to B7 are recorded in columns C1, C2 C3, etc. of member 15 in succession. In cases where characters are to be printed column by column, on the other hand the contacts Y and Z are set to the positions shown in broken lines in FIG. 8B. In this case the scanning circuit 21 plays no part. However, the pulse which is transmitted by K8 and which is then applied to selectors 32 and 33 has the effect on the one hand of causing a positive voltage to appear at that output of selector 32 to which N1 is connected and thus of selecting row T1 in member 15, and on the other hand of rendering gate Q1 conductive. Under these conditions, the first group of seven bits which is transmitted by generator 17 to member 15 via conductors B1 to B7 and gate Q1 is recorded in the last seven cores on row T1, that is to say in cores such as T1n and T1m. The pulse which is transmitted along F1 and which is applied, after being delayed by R8, to input 35 of selector 32 thus causes the selector to advance one step, so that row T2 in member 15 is now selected. The second group of seven bits which is then transmitted by generator 17 to member 15, via conductors B1 to B7 and gate Q1, is thus recorded in the last seven cores in row T2, that is to say in cores such as T2n and T2m. The pulse which is transmitted along F2 and which is applied, after being delayed by R8, to input 35 of selector 32 causes the selector to advance a further step, thus selecting row T3 in member 15. The recording in the storage member 15 of the next three groups of seven bits which are transmitted in succession by the generator 17 takes place in a similar way to that which has just been described and for this reason the operations involved will not be described in detail. It will merely be mentioned that, when the recording of the fifth of these groups in the last seven cores in row T5 of member 15 has been completed, the magnetic cores in the said member in which "1" bits have been recorded together form an image of one of the characters to be printed. It will be assumed that this character is for example the one indicated in FIG. 5 by the states of the magnetic cores situated in columns Cn to Cn-6 of the storage member 15, that is to say the character A. When the recording of the five groups of seven bits representing this character has been completed, a delayed pulse appears at the output of R8 (FIG. 8A) and, when applied to input 35 of selector 32, causes the positive potential to disappear from that output of the said selector to which N5 is connected, while a positive voltage again appears at the output of the selector to which N1 is connected. After this, the pulse which is transmitted by member 18 along conductor F6 is applied to selector 33, which then advances one step, thus rendering gate Q2 conductive while gate Q1 becomes nonconductive. The pulses which are then transmitted by member 18 along conductors F7 and F8 have no effect on selectors 32 and 33 so that, when the generator 17 transmits five further groups of seven bits in succession, these five groups are recorded in member 15 in the magnetic cores which, in rows T1 to T5, are situated in columns Cn-10 to Cn-6. Of these thirty-five cores, those in which "1" bits have been recorded together form the image of another character to be printed. The recording of the groups of seven bits in member 15 continues in this way until such time as the recording of the final five groups of seven bits has been completed. At this moment, the pulse which is transmitted by mixing circuit M18 and which is applied to input D of the delay line 22 initiates the recording, on drum 11, of the characters whose images are formed by the "1" data bits which have been recorded in member 15. It will be assumed that these characters, which are the first characters in each of the lines to be printed, are for example the characters A, F, D. After this, the member 15 is reloaded in the manner described above and a fresh pulse applied to input D of 22 then initiates the recording, on the drum 11, of the second characters in each of the lines to be printed, these characters being for example the characters P, O and O. The operations of reloading the member 15 and recording the characters on the drum continue until there are no more characters to be recorded on the drum. The appearance of the text which is printed on the strip of paper by the drum after it has been recorded in this way is as shown in FIG. 7, the lines of the printed text extending parallel to the lengthwise direction of the strip. If this text is compared with that shown in FIG. 6, which is obtained by setting the changeover contacts Y and Z to the position indicated in solid lines in FIG. 8B, it can be seen that the lines of the text shown in FIG. 6 extends parallel to the width of the paper strip and that the characters making up the text in FIG. 7 lie at an angle of 90° to those making up the text in FIG. 6.

Although the description and the accompanying drawings relate to preferred embodiments of the invention, it is understood that various modifications, additions or substitutions which do not exceed the scope of the said invention may be made, depending upon circumstance and the application, without the principle of the invention being thereby effected. Thus, the recording member 13 shown in FIG. 1 may for example be replaced by a recording member of a known kind having mn recording units arranged in m rows and n columns, each of the mn storage locations in the storage member 15 then being connected to a respective one of the recording units to enable the units to receive data bits which are extracted simultaneously from the said storage locations.

We claim:

1. In a dot recording machine comprising a recording medium and at least a line of n recording units for recording dots on this medium, said line of recording units and said medium being moved relative to one another in a direction of movement perpendicular to said line, a control arrangement for controlling the recording on said medium of at least one combination of dots forming an image belonging either to a first series of given images, or to a second series of given images, each of the images in the first series being formed by dots lying within a matrix comprising m rows and p columns, with $n \geq m \geq p$, and each of the images in the second series being formed by dots lying within a matrix comprising p rows and m columns, each of the images in the said second series being identical to a respective one of the images in the first series, but being rotated through 90° from it, said control arrangement comprising:

- a storage member comprising mn storage locations, each adapted to contain one data bit required to cause a dot to be recorded on the medium, said storage locations being disposed in m rows and n columns and each of said columns being connected to a respective one of the n recording units to enable the latter to receive the data bits which are extracted, row by row, from the said storage locations,
- a first bit generator having km inputs and p outputs, k being a whole number, the said first bit generator being adapted to transmit a group of p data bits from its p outputs whenever one of its inputs is actuated, the p outputs of that first generator being connected to respective ones of the first p of the m rows of the storage member,
- said first bit generator being operative in response to the actuation of m successive of its km inputs transmitting from its p outputs m groups of p data bits which, when stored in the storage member, are representative of an image in the first series,
- a second bit generator having kp inputs and m outputs, the said second bit generator being adapted to transmit a group of m data bits from its m outputs whenever one of its inputs is actuated, the m outputs of that second generator being connected to respective ones of the m rows of the storage member,
- said second bit generator being adapted for, in response to the actuation of p successive of its kp inputs, transmitting from its m outputs p groups of m data bits which, when stored in the storage member, are representative of an image in the second series,
- and selecting and control means associated with said first and second generators and arranged to be set either to a first state or to a second state, said means being adapted on one hand, when they are set to their first state and when they receive a combination of signals representing in coded form an image to be formed on the medium, to energize m of the km inputs of the first generator and to cause each of the m groups of p data bits supplied by said generator to be recorded in a respective one of m successive columns of the storage member, and on the other hand, when they are set to their second state and when they receive the said combination of signals, to energize p of the kp inputs of the second generator and to cause each of the p groups of m data bits supplied by said second generator to be recorded in a respective one of p successive columns of the storage member.

2. A recording control arrangement according to claim 1, wherein the selecting and control means comprise a decoding register adapted to contain temporarily a combination of signals representing an image to be formed on the medium, an energization control member connected to be under control of the decoding register, and a two-position switching member connected between the said energization controlling member and the bit generators, said energization controlling member being adapted to energize, in response to the reception of a control pulse, either m of the km inputs of the first generator solely in cases where the switching member is set to its first position, or p of the kp inputs of the second generator solely in cases where the switching member is set to its second position, said m and p inputs being selected by the energization controlling member as a result of the decoding operation performed by the decoding register.

3. In a dot recording machine comprising a recording medium and at least a line of n recording units for recording dots on this medium, said line of recording units and said medium being moved relative to one another in a direction of movement perpendicular to said line, a control arrangement for controlling the recording on said medium of at least one combination of dots forming an image belonging either to a first series of given images, or to a second series of given images, each of the images in the first series being formed by dots lying within a matrix comprising m rows and p columns, with $n \geq m \geq p$, and each of the images in the second series being formed by dots lying within a matrix comprising p rows and m columns, each of the images in the said second series being identical to a respective one of the images in the first series but being rotated through 90° from it, said control arrangement comprising:

- a storage member comprising mn storage locations, each adapted to contain one data bit required to cause a dot to be recorded on the medium, said storage locations being disposed in m rows and n columns and each of said columns being connected to a respective one of the n recording units to enable the latter to receive the data bits which are extracted, row by row, from the said storage locations,
- a bit generator having kp inputs and m outputs, k being a whole number, the said bit generator being adapted to transmit a group of m data bits from its m outputs whenever one of its inputs is actuated,
- said bit generator being adapted for, in response to the actuation of p successive of its kp inputs, transmitting from its m outputs p groups of m data bits which, when stored in the storage member, are representative of one image to be recorded on the medium,
- and selecting and control means associated with the said bit generator and arranged to be set either to a first state or to a second state, said means being adapted on one hand, when they are set to their first state and when they receive a combination of signals representing in coded form an image to be formed on the medium, to energize p of the kp inputs of the generator and to cause each of the p groups of m bits supplied by the generator to be recorded in a respective one of p successive columns of said storage member.

The data bits thus stored in the pm locations of said p successive columns of the storage member being representative of an image in the first series,
and on the other hand, when they are set to their second state and when they receive the said combination of signals, to energize p of the kp inputs of the generator and to cause each of the p groups of m bits supplied by the generator to be recorded in a respective one of p sets of storage locations in the storage member, each of the p sets embracing m locations and being situated in a respective one of the first p rows of the storage member, the data bits thus stored in the pm locations of said first p rows of the storage member being representative of an image in the second series.

4. A control arrangement according to claim 3, wherein the n columns of the storage member being distributed into q sets of columns and each of said sets comprising m columns, the selecting and control means comprise:

a row selecting member having p outputs each intended to be connected to one respective of the first p rows of the storage member to energize successively each of said p rows as each of the p groups of m bits is supplied by the bit generator:

a set selecting device disposed between the said q sets of columns and the m outputs of the bit generator to cause the p groups of m bits supplied by the bit generator, as a result of the reception of a combination of signals, to be recorded in the storage locations pertaining to a same set, a column selecting member having n outputs each intended to be connected to one respective of the n columns of the storage member to energize successively each of said columns to allow the p groups of m bits supplied by the bit generator, as a result of the reception of said combination of signals, to be recorded in p successive columns of the storage member, a first series of changeover contacts arranged to be set either to a first position or to a second position and adapted on one hand, when they are set to their first position, to place each of the n outputs of the column selecting member into communication with each respective of the n columns of the storage member, and on the other hand, when they are set to their second position, to place the q sets of columns of that storage member into communication with the m outputs of the bit generator;

and a second series of changeover contacts arranged to be set either to a first position when the contacts of the first series are also set to their first position, or to a second position when said contacts of the first series are also set to their second position, the contacts of said second series being adapted on one hand, when they are set to their first position, to place each of the m rows of the storage member into communication with each respective of the m outputs of the storage member, and on the other hand, when they are set to their second position, to place each of the first p rows of the storage member, into communication with each respective of the p outputs of the row selecting member.

5. A control arrangement according to claim 4, wherein the selecting and control means further comprise a decoding register adapted to contain temporarily a combination of signals representing an image to be formed on the medium, and an energization controlling member which is placed under the control of the said decoder register and which is adapted to energize successively, in response to the reception of a control pulse, p of the kp inputs of the bit generator, these p inputs being selected by the energization controlling member as a result of the decoding operation performed by said register.

6. A control arrangement according to claim 5; wherein the set selecting device comprising:

a series of q gates each associated to one respective of the q sets of columns of the storage member, each of said gates being adapted to be set either to a conductive state or to a non-conductive state, each of said gates having one hand m inputs each connected to one respective of the m outputs of the bit generator, and on the other hand, m outputs each connected to one respective of the m columns of the associated set through the first series of changeover contacts, so that, when said contacts are set to their second position and when one of said gates is set to its conductive state, the m columns of the storage member which are associated to that gate are placed into communication with the m outputs of the bit generator, and a gate selector connected to said q gates and adapted to render conductive only one of said gates at a time, in response to the reception of a pulse signal applied to said gate selected just before the application of a control pulse to the decoder register, the said q gates being successively rendered conductive to allow the p groups of m bits corresponding to different images to be formed on the medium, to be recorded into different sets of columns of the storage member when the first and second series of contact are set to their second position.

* * * * *